United States Patent
McCoy

(10) Patent No.: US 8,783,631 B2
(45) Date of Patent: Jul. 22, 2014

(54) LOW EMF COMPACT DUCT SPACER

(71) Applicant: Donald P McCoy, Lake Forest, IL (US)

(72) Inventor: Donald P McCoy, Lake Forest, IL (US)

(73) Assignee: Underground Devices, Inc., Northbrook, IL (US)

( * ) Notice: Subject to any disclaimer, the term of this patent is extended or adjusted under 35 U.S.C. 154(b) by 0 days.

(21) Appl. No.: 13/869,676

(22) Filed: Apr. 24, 2013

(65) Prior Publication Data

US 2014/0034790 A1   Feb. 6, 2014

Related U.S. Application Data

(60) Provisional application No. 61/678,946, filed on Aug. 2, 2012.

(51) Int. Cl.
| | | |
|---|---|---|
| *F16L 3/22* | (2006.01) | |
| *F16L 3/02* | (2006.01) | |
| *H02G 9/06* | (2006.01) | |
| *H02G 1/08* | (2006.01) | |

(52) U.S. Cl.
CPC .. *F16L 3/02* (2013.01); *H02G 9/06* (2013.01); *H02G 1/08* (2013.01)
USPC ........ 248/68.1; 248/74.1; 248/74.2; 248/74.4

(58) Field of Classification Search
CPC ........... F16L 3/222; F16L 3/2235; H02G 9/06
USPC ....................... 248/68.1, 49, 74.1, 74.2, 74.4; 405/184.4; 211/60.1; 138/112
See application file for complete search history.

(56) References Cited

U.S. PATENT DOCUMENTS

| | | | |
|---|---|---|---|
| 792,892 A | | 6/1905 | Gest |
| 1,805,990 A | | 5/1931 | Makowski |
| 1,821,234 A | | 9/1931 | Parker |
| 2,462,399 A | | 2/1949 | Hinchman |
| 2,577,120 A | * | 12/1951 | Franz .......................... 211/85.18 |
| 2,686,643 A | | 8/1954 | Bloom et al. |
| 2,849,027 A | | 8/1958 | Tetyak |
| 2,937,833 A | | 5/1960 | Sachs |
| 3,125,196 A | | 3/1964 | Fenner |
| 3,464,661 A | | 9/1969 | Alesi |

(Continued)

OTHER PUBLICATIONS

Carlon Snap-Loc Spacers Brochure and Literature, pp. 225-226, Installation instructions (2 pages), and Specifications (1 page), dated 2007, total 5 pages.

(Continued)

*Primary Examiner* — Terrell McKinnon
*Assistant Examiner* — Daniel Breslin
(74) *Attorney, Agent, or Firm* — David W. Okey LLC

(57) ABSTRACT

Conduit spacers useful in preparing duct banks with reduced electromagnetic fields (EMF) are disclosed. The conduit spacers are designed to maximize phase cancellation of EMF from a closely-spaced series of electric power cables placed in conduits supported underground by the conduit spacers. The spacers are also designed to minimize the EMF above ground by reducing the distance needed to bury the cables for a given EMF above ground. In one embodiment, the spacers place conduits adjacent one another for maximum cancellation of a single three-phase cable installation. In another embodiment, the spacers place conduits adjacent one another for maximum cancellation for a dual three-phase cable installation, including cross-phase cancellation, e.g., A-B-C and C-B-A.

23 Claims, 18 Drawing Sheets

(56) References Cited

U.S. PATENT DOCUMENTS

| | | | |
|---|---|---|---|
| 3,523,667 A | | 8/1970 | Guerrero |
| 3,643,005 A | | 2/1972 | Mathews |
| 3,765,629 A | | 10/1973 | Voelker |
| 3,783,907 A | | 1/1974 | Skinner |
| 3,856,246 A | | 12/1974 | Sinko |
| 3,964,707 A | | 6/1976 | Lewis |
| 3,977,703 A | | 8/1976 | Curtis |
| 4,093,076 A | * | 6/1978 | Newton ............... 211/74 |
| 4,099,626 A | | 7/1978 | Magnussen |
| 4,114,241 A | | 9/1978 | Bisping |
| 4,183,484 A | | 1/1980 | Mathews |
| 4,244,542 A | | 1/1981 | Mathews |
| 4,306,697 A | | 12/1981 | Mathews |
| D265,052 S | | 6/1982 | Husted |
| 4,601,447 A | | 7/1986 | McFarland |
| 4,618,114 A | * | 10/1986 | McFarland ............... 248/65 |
| D296,074 S | | 6/1988 | Seyfarth |
| 4,834,825 A | | 5/1989 | Adams et al. |
| 5,018,260 A | | 5/1991 | Ziu |
| 5,104,072 A | | 4/1992 | Kuo |
| 5,137,306 A | | 8/1992 | Flood |
| 5,372,388 A | | 12/1994 | Gargiulo |
| 5,605,419 A | * | 2/1997 | Reinert, Sr. ............... 405/154.1 |
| 5,827,441 A | * | 10/1998 | Solbjorg ............... 249/91 |
| 6,076,863 A | | 6/2000 | Brown et al. |
| 6,242,700 B1 | | 6/2001 | Smith |
| D447,931 S | * | 9/2001 | Aitken ............... D8/354 |
| 6,375,017 B1 | | 4/2002 | Schattner et al. |
| 6,711,328 B2 | | 3/2004 | Griffioen et al. |
| 6,834,527 B2 | | 12/2004 | Hopwood |
| D508,842 S | * | 8/2005 | Paolini ............... D8/395 |
| 7,223,052 B1 | | 5/2007 | Evans |
| D597,403 S | * | 8/2009 | Ho et al. ............... D8/396 |
| 7,806,629 B2 | | 10/2010 | McCoy |
| 7,922,012 B2 | * | 4/2011 | Sisley ............... 211/60.1 |
| 7,942,371 B1 | | 5/2011 | McCoy |
| D641,611 S | * | 7/2011 | Minayoshi ............... D8/354 |
| 8,020,259 B2 | * | 9/2011 | Ho et al. ............... 24/129 R |
| 8,020,811 B2 | * | 9/2011 | Nelson ............... 248/68.1 |
| 8,342,474 B2 | * | 1/2013 | Gilbreath ............... 248/558 |
| 2007/0107974 A1 | * | 5/2007 | Ueno ............... 180/444 |
| 2009/0057497 A1 | | 3/2009 | Bradbury |
| 2009/0224111 A1 | * | 9/2009 | Gilbreath ............... 248/68.1 |
| 2010/0019106 A1 | | 1/2010 | Sisley |
| 2010/0122836 A1 | | 5/2010 | Pollard, Jr. |
| 2012/0325983 A1 | | 12/2012 | Vrame |
| 2013/0333933 A1 | | 12/2013 | Mantiply et al. |

OTHER PUBLICATIONS

Reducing Magnetic Fields from Overhead High Voltage Transmission Lines, M.S.H. Salameh et al., IJRRAS 4 (1) Muly 2010, 14 pages.

Transmission Lline EMF Design Guidelines, Pacific Gas and Electric Co. May 20, 1994, 25 pages.

Final Transmission EMF Management Plan, Jefferson-Martin 230 KV Transmission Project, Jan. 6, 2005, 21 pages.

Underground Electric Transmission Lines, Public Svc. Comm. of Wis., May 2011, 22 pages.

Scattergood-Olympic Transmission Line Project, Draft Environmental Impact Report, Los Angeles Dept. of Water and Power, Mar. 2012, 231 pages.

Electric Power High-Voltage Transmission Lines: Design Options, Cost and Electric and Magnetic Field Levels, J.B. Stoffel et al. Argonne Labs, Nov. 1994, 85 pages.

Carlon Snap-N-Stac Combo Spacers Literature p. 1-4, Dated Jul. 20, 2008, total 4 pages.

Office Action in U.S. Appl. No. 14/056,248, dated May 7, 2014, 11 pages.

* cited by examiner

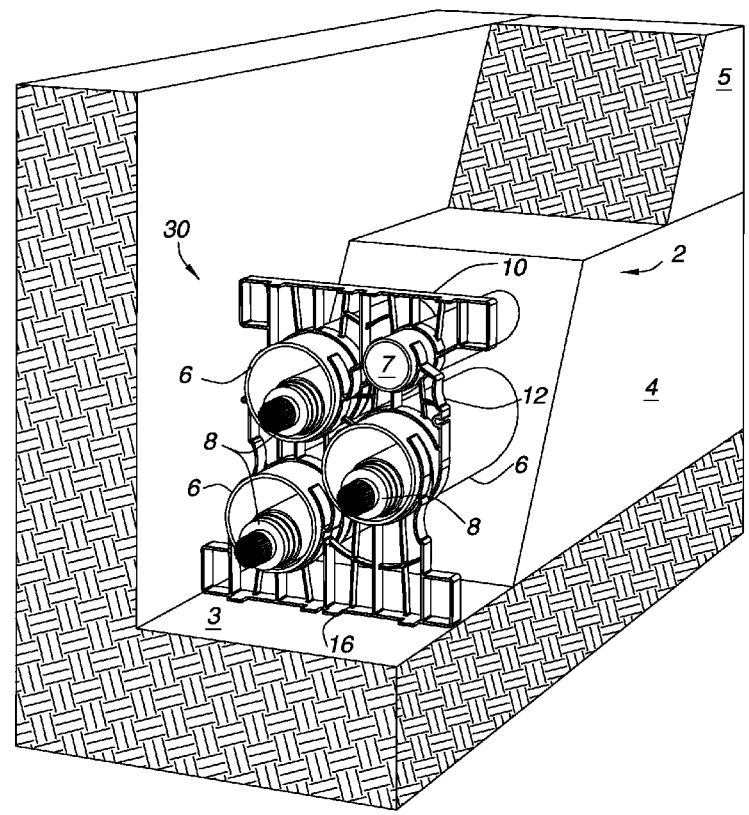
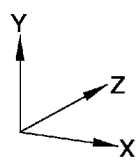
FIG. 3

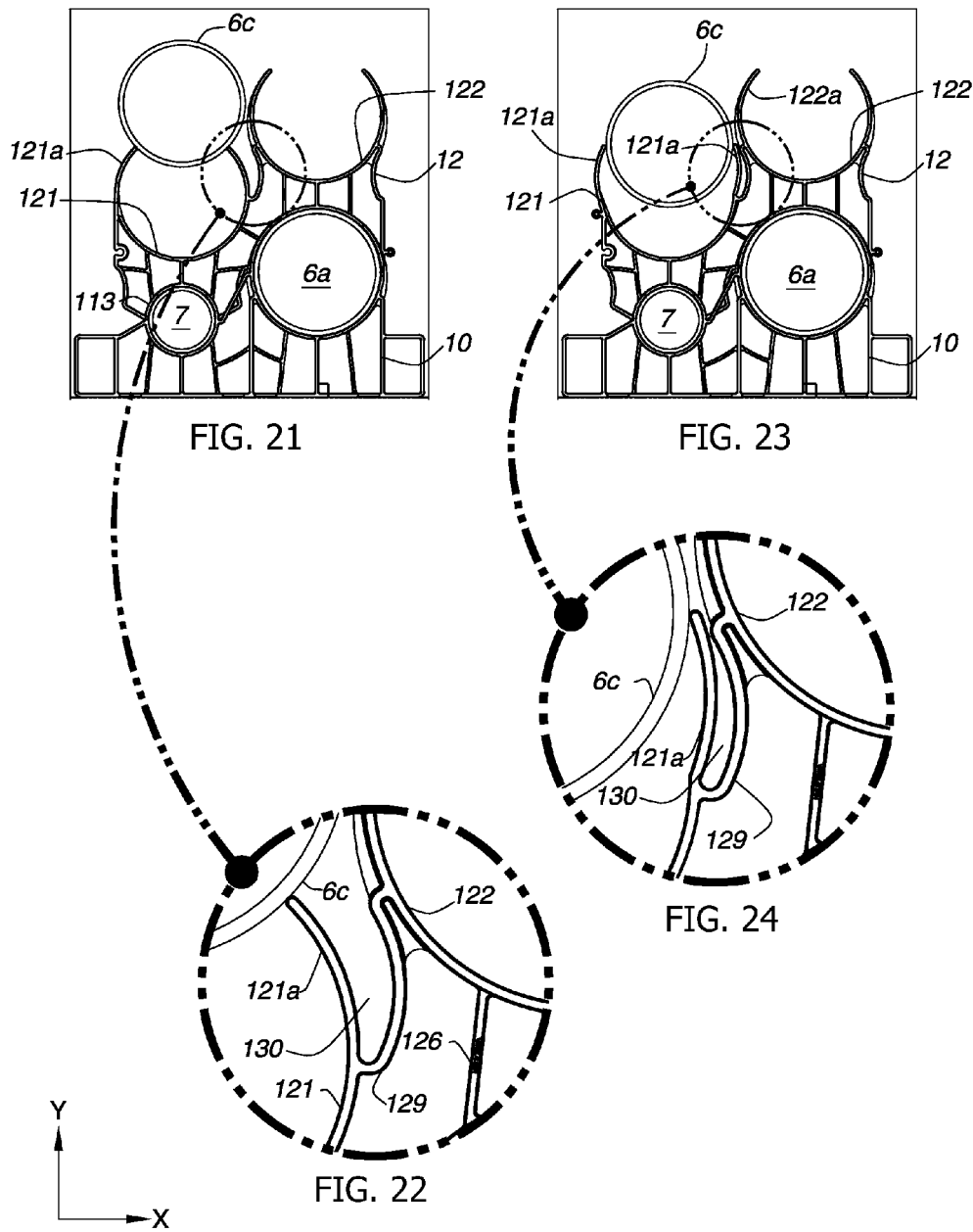

LOW EMF COMPACT DUCT SPACER

TECHNICAL FIELD

This application claims priority to, and the benefit of, U.S. Non-provisional Appl. 61/678,946, filed 2 Aug. 2012, which is hereby incorporated by reference in its entirety.

TECHNICAL FIELD

The technical field is that of methods and apparatus for separating and supporting power and communication conduits in underground trenches in order to minimize electromagnetic field emissions.

BACKGROUND

Electric-power transmission is the bulk transfer of electrical energy from generating power plants to electrical substations. Most transmission lines use high-voltage three-phase alternating current (AC) that requires three conductors (three cables). Three-phase alternating current (AC) is used because it can be transmitted at high voltages (110 kV or above) or extra high voltage (230 kV to 765 kV) to reduce the energy lost in long-distance transmission. Using transformers, the electricity can then be efficiently reduced to sub-transmission level (33 kV to 132 kV) and distribution level (3.3 kV to 25 kV). Finally, the energy is transformed to low voltage (240V or 440V) for use in homes and small business. Due to the evolution of power systems, the transmission voltages, sub-transmission voltages, and distribution voltage ranges overlap somewhat.

Transmission lines may be supported by poles or structures and run overhead or to a lesser degree may be run underground. Some power lines are directly buried in the ground but, as a standard practice, mission critical underground transmission lines are placed in duct banks. The duct banks are normally at least three feet below ground level and consist of multiple conduits that are located a controlled distance apart in an organized matrix that is encased in concrete. In this disclosure, the words duct, conduit and pipe are interchangeable and have the same meaning. In addition, the word concrete is used interchangeably with thermal concrete, concrete slurry or flowable fill. These materials are used to separate the conduits and conduct heat away from the conduits.

The power cables are placed in concrete-encased duct banks for several reasons. The concrete protects them, primarily from digging, whether with hand tools or with mechanized equipment, such as backhoes. Backfill, roads, railroads and the like are placed on top of the duct bank, resulting in heavy loads on the duct bank. A duct bank backfill material other than concrete may settle unevenly. As the concrete settles, the conduits within the concrete matrix settle in unison. The base spacers in the duct bank are supported by undisturbed earth and resist movement of the settling conduits. Irregular movement caused by settling would otherwise deform or crush the conduits. The encased conduits, arranged in their current volume of usage, are made from PVC, HDPE or FRE (fiberglass-reinforced epoxy). Other conduit materials are used to a much lesser degree. The concrete also acts to dissipate the heat generated by transmission of electric power through the cables.

A typical method that is used to construct an underground power transmission line is as follows:
1. Open cut a trench to the required width, depth and length.
2. If required, reinforce or shore up the walls of the trench to insure that it doesn't cave in during the duct bank installation process.
3. Build the duct bank.
    a. Place base spacers on the bottom of the trench.
    b. Top load a row of conduits into the base spacers.
    c. Solvent cement the row of conduits to the previously laid section of duct bank.
    d. Place an intermediate row of spacers atop the previously laid row of duct spacers or conduits.
    e. Top load the next row of conduits into the intermediate spacers.
    f. If "e" was the top row of conduits go to "g," otherwise go to "d."
    g. If desired, place a top row of spacers atop the previously laid row of duct spacers or conduits. This top row of spacers can be used to gage the depth of the concrete cover and aid in the hold down.
4. Place a hold down mechanism atop the duct bank. A hold down mechanism is required to keep the duct bank from floating when the concrete is poured. An example is to use rebar (reinforcing rods of steel) to tie the duct bank structure to the floor or side walls of the trench.
5. Pour concrete over the duct bank, completely encasing the duct bank. Normally there should be 3 inches of concrete between the bottom of the lower-most conduits and the bottom of the trench, 3 inches of concrete on each side of the duct bank and 3 inches of concrete cover atop the upper-most row of conduits.
6. Allow the concrete to harden.
7. Remove the trench side wall shoring and hold down mechanism as applicable.
8. Backfill the exposed trench opening with the appropriate backfill material. Compact the backfill in lifts as required.
9. Mate the ends of the duct bank with manholes or vaults that have normally already been put in place.
10. Pull the cables down through the manholes or vaults and through the conduits.
11. Restore the surface above the backfill and around the manholes or vaults as required.

Most overhead and underground transmission lines consist of two sets of three cables (six cables). The double set of cables allows for the rerouting of power through the backup cable set in the event of an emergency situation. For underground duct banks the cable sets may be situated one atop the other or side by side depending on the width of the real estate available and the obstructions encountered along the length of the duct bank.

An electro-magnetic field (EMF) emanates from electric current being transmitted by power cables. Extensive studies have been made on how arrangement of the cables affects EMF from the cables. *Electric Power High-Voltage Transmission Lines: Design Options, Cost and Electric and Magnetic Field Levels*, J. B. Stoffel, E. D. Pentecost, R. D. Roman and P. A. Traczyk, Environmental Assessment Division, Argonne National Laboratory, ANL/EAD/TM-31, November 1994 (hereinafter "Stoffel"). The EMF is strongest close to the cables and diminishes as the distance from the cable increases. The highest EMF levels for an underground transmission line are directly above the transmission line during maximum current flow. The higher the current flow, of course, the higher the EMF. The study found that placing power lines in a triangular or delta configuration and placing cables closer together led to an apparent cancellation effect and a lower EMF. The study considered a 345 kV line with phases spaced 8 inches (approx. 20 cm) apart and buried in a steel pipe 5 ft (approx. 1.5 m) below the surface. The study reported that electric fields were eliminated in underground cables and that magnetic fields very much reduced at all points except directly above the cable. Previous work found a 94% reduction in magnetic field strength if the conduits were encased in a steel pipe. Stoffel, citing *Cost Effectiveness Analysis: Mitigation of Electromagnetic Fields*," from Commonwealth Associates, Inc., 1992.

Some studies have found statistical correlations between various diseases and living or working near power lines. In a residential setting, there is limited evidence of carcinogenicity in humans. Some statistical studies have reported that incidents of childhood leukemia and miscarriages increase when the average exposure to a residential power-frequency magnetic field is above 3 mG (milliGauss) to 4 mG. See, e.g., *A Pooled Analysis of Magnetic Fields and Childhood Leukaemia*, A. Ahlbom et al., Br. J. Cancer 200; 83:692-8, cited in *Childhood Cancer in Relation to Distance from High Voltage Power Lines in England and Wales*, G. Draper et al., Br. Med. J., 2005, vol. 330, pp 1290-94. None of the studies or evidence available to date has conclusively proven that exposure to an EMF above 3 to 4 mG is detrimental to human health. Nevertheless, many power utilities and jurisdictions are acting on the side of caution and establishing guidelines and standards that require a "low cost-no cost" mitigation of the EMF emanating from new electric power transmission and distribution lines and installations.

The EMF emanating from power cables may be reduced considerably by phase cancellation using a triangular configuration and reducing the distance between the cables. The phase cancellation technique may require using larger diameter cables to reduce heat generation. Additional EMF reduction may be gained from cross-phase placing of the cables of the six-cable configuration. Stoffel, pp. 16-19, 21-23 and 30.

What is needed is better conduit spacing and a better conduit spacer to minimize electromagnetic emissions from underground cables. The present disclosure includes discussions of systems and methods to minimize these emissions in an economical manner.

BRIEF SUMMARY

One embodiment is a conduit spacer. The conduit spacer includes a lower horizontal base and three bodies supported above the lower horizontal base, each body having an opening adapted to support a conduit or pipe, wherein centers of the three conduits or pipes approximate an equilateral triangle with a base in a nominally vertical direction.

Another embodiment is a conduit spacer. The conduit spacer includes a lower portion including a horizontal base and at least two conduit support bodies supported above the base, each conduit support body having an open end extending away from said base. The conduit spacer also includes an upper portion including two conduit support bodies having open ends extending downwards and at least one conduit support body having an open end extending upwards, wherein the at least two conduit support bodies having open ends extending away from said base and the at least one conduit support body having an open end extending upwards are adapted to support three conduits or pipes, wherein centers of the three conduits or pipes approximate an equilateral triangle with a base in a nominally vertical direction.

Another embodiment is a conduit spacer. The conduit spacer includes a lower portion made from plastic material and including a base and two support bodies above the base, the support bodies having open ends extending upwards away from said base; and an upper portion made from plastic material and including two support bodies having open ends extending downwards and at least one support body having an open end extending upwards, wherein three of the support bodies having open ends extending upwards are adapted to support three conduits or pipes having a same diameter, and wherein centers of the three conduits or pipes form an equilateral triangle with a base in a vertical direction, the base in the vertical direction defined by centers of the conduits or pipes supported by the at least one support body and one of the two support bodies above the base having open ends extending upwards away from said base, and wherein the other of the two support bodies above the base having an open end extending above the base is adapted to support a conduit or pipe having a diameter smaller than the same diameter.

Another embodiment is a conduit spacer. The conduit spacer includes a spacer body comprising a set of three orifices in a configuration of an equilateral triangle having one side perpendicular to a bottom of a trench, wherein the spacer body is adapted for placement into the trench for supporting conduits for power cables.

Yet another embodiment is a method for spacing electrical power cables. The method includes steps of arranging a first electrical power cable in a first plastic duct spacer; and arranging second and third electrical power cables in a second plastic duct spacer, wherein the second power cable is directly above or below the first power cable, and centers of the three cables approximate an equilateral triangle having a vertical base formed by the centers of the first and second cables.

Another embodiment is a method for spacing electrical power cables. The method includes steps of arranging a first electrical cable into at least one plastic duct spacer; and arranging second and third electrical cables into the at least one plastic duct spacer, wherein the second cable is directly above or below the first cable, and centers of the three cables approximate an equilateral triangle having a vertical base formed by the centers of the first and second cables.

Other embodiments and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. The drawings are meant to be illustrative rather than limiting. In the drawings:

FIG. 3 is a perspective view of a duct bank using duct spacers to separate the conduits of 3-phase power lines in a triangular arrangement;

FIGS. 21-24 depict detailed view of a process for insertion of a conduit into a spacer.

While the invention will be described in connection with certain preferred embodiments, there is no intent to limit it to those embodiments. The intent is to cover all alternatives, modifications and equivalents as included within the spirit and scope of the invention as defined by the appended claims.

DETAILED DESCRIPTION

The duct spacers disclosed herein are directed to constructing compact underground duct banks for concrete-encased installations. The configuration that is preferred is a delta or equilateral triangle configuration in which a base of the triangle is perpendicular to a floor of the trench into which the duct bank is placed. This arrangement has the advantage of the phase cancelling effect of the closely-spaced delta configuration of cables, and also has the advantage of the very compact duct bank that is formed as low to the bottom of the trench as possible. The prior art primarily shows conductors arranged in a linear formation (with a horizontal or vertical base) or shows the conductors arranged as in a right triangle—formed by one or two of the conductors in a first row or column and the other two or one conductor on an adjacent row or column.

Molded Spacer Series

This disclosure includes generally two types of duct spacers, stackable spacers, such as those depicted in FIGS. 1-8 and 13-24. Single type spacers, less amenable to stacking, are exemplified in FIGS. 9-12. While not restricted by the type of process used to manufacture them, the stackable spacers are typically referred to as molded spacers. Single-type spacers, also not restricted by type of manufacture, may be referred to as fabricated spacers. The duct spacers described herein, especially the stackable-type spacers, may include provisions for supporting conduit or pipe placed into the spacers. These provisions may be referred to as a conduit support body having an open end extending upwards, or extending downwards. The provisions may also be referred to as a generally U-shaped body or an upward or downward facing arcuate body, or perhaps as a body having an opening adapted to support a conduit or pipe. The opening, in some embodiments, may be in a direction facing generally upwards or downwards. In its simplest form, the opening could be an upward or downward facing cradle, or the opening could be described as "an upward or downward depression suitable for positioning and supporting a conduit or conduits." All of these are intended for use as a conduit support body.

Figure 1:
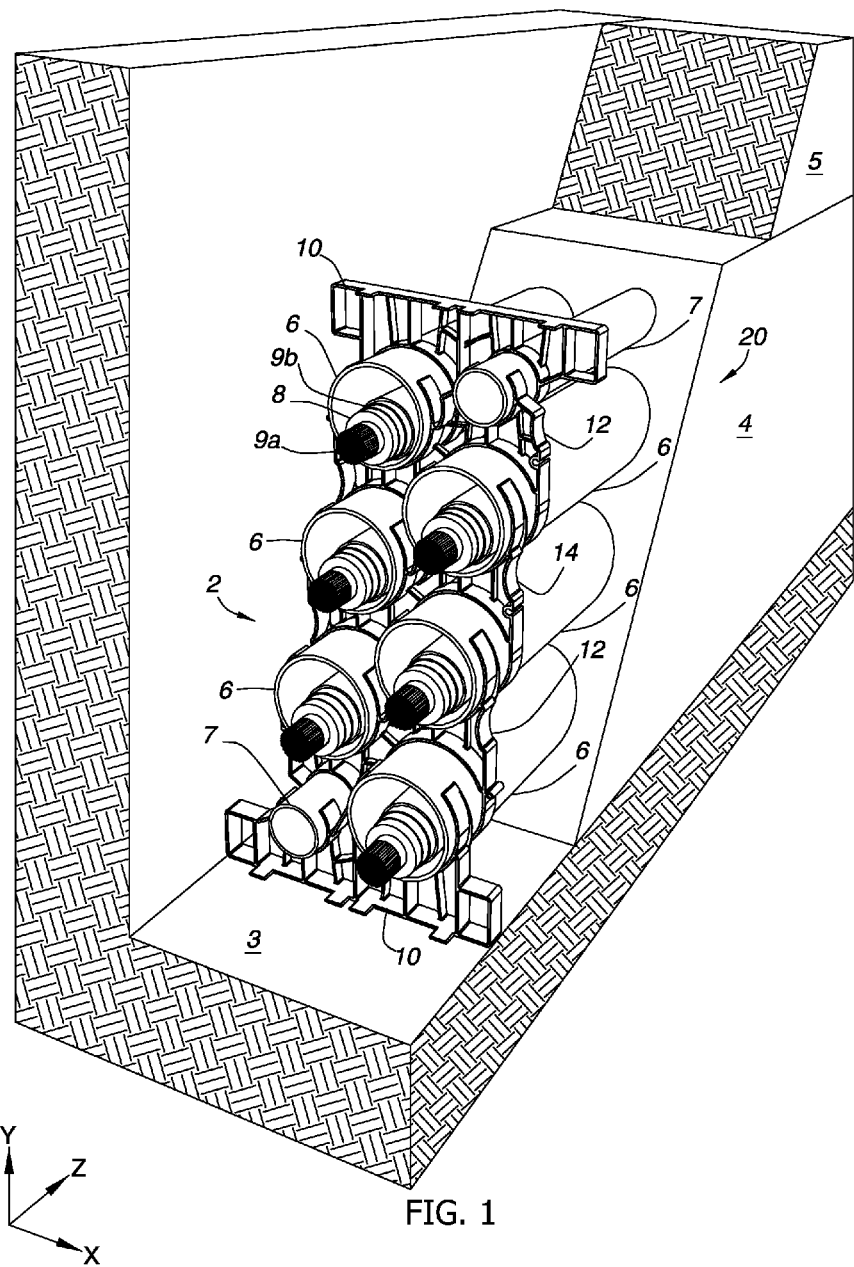
FIG. 1 is a perspective view of a duct bank using conduit duct spacers to separate the conduits of dual 3-phase power lines in a triangular arrangement.

A first embodiment duct bank with the spacers described herein is presented in the perspective view of FIG. 1. The installation includes a duct bank 2 which has been placed in a trench 3 and then encased in protective concrete 4. After the concrete cures, the installation is backfilled with the overburden or earth 5 that was previously removed. Duct bank 2 includes a plurality of large conduits 6 and small conduits 7. The conduits are stacked atop each other as shown using duct spacers 10, 12, 14, 12 and 10. The duct spacers are staggered horizontally to avoid creation of a vertical shear plane in the concrete. The figure depicts spacers suitable for a dual 3-phase arrangement 20 of power cables to be placed into the large conduits shown. The smaller conduits are typically not used for power cable, but may instead be used for fiber optic communications cables, control cables and thermocouples or other temperature elements for monitoring duct bank temperatures. The smaller conduits allow options for the utility without increasing the size or cost of the duct bank. Large conduits 6, 6a, 6b and 6c are identical; the designations 6a, 6b and 6c, etc., are used to designate placement or spacing of particular conduits 6 in the figures that follow.

Large conduits are "large" compared to the "small" conduits. For example small conduits may be nominally 2-in, 3-in or 4-inch diameter, and large conduits may be nominally 5-in, 6-inch or 8-diameter. The actual outer diameters may be, respectively, 2.375 in (60.3 mm), 3.50 in (88.9 mm), 4.50 in (114 mm), 5.56 in (141 mm), 6.625 in (168 mm) and 8.625 in (232 mm). The top portion of a spacer orifice may be a little smaller than the outer conduit dimension, e.g., about ⅛" (about 3 mm) less in diameter, to allow for a pressure-retention fit of the spacer ears over the conduits. The embodiments disclosed herein are not limited to these nominal or actual diameters, but the conduits or cables used may be any suitable diameters. Coordinate axes for reference are depicted in FIG. 1, with axis Z along a width of the spacers or a length of the duct bank, axis X along a front face or length of the spacers, that is, along a width of the duct bank, and axis Y along a height of the spacers or duct bank.

Duct bank 2 includes a bottom or level one conduit or duct spacer 10, the duct spacer holding a large conduit 6 and a smaller conduit 7. Duct spacer 10 has two upward facing, generally U-shaped members to hold the conduits, as does each of duct spacers 12 and 14. A first level two intermediate spacer 12 is mounted directly above, i.e., stacked and interlocked by means of the conduits 6, 7, atop bottom conduit spacer 10. Conduit spacer 12 sits atop the large conduit and small conduit mounted in conduit spacer 10, with lower portions of conduit or duct spacer 12 mounted directly on the conduits 6, 7. Duct spacer 12 holds two large conduits 6 in its upper portions. A third spacer, level three intermediate spacer 14 sits atop these two large conduits, resting its lower portions on the two large conduits 6. Two additional large conduits 6 are in turn supported by the upper portions of spacer 14. This arrangement is repeated for a fourth spacer, a second level intermediate spacer 12, which is inverted. Finally, an inverted bottom spacer 10, acting as a top spacer, sits atop one final large conduit 6 and one small conduit 7 in its U-shaped housing portions. Additional layers may instead be added by using additional intermediate spacers before using the top level.

In this figure, each large conduit 6 is portrayed with a power cable 8 inside the conduit. Power cables 8 typically each have a central conductive core 9a made of many strands of copper or other suitable conductor, and outer insulation 9b made of non-conductive material. As is well known to those with skill the art, the outer insulation helps to protect the conductor inside.

Figure 2:
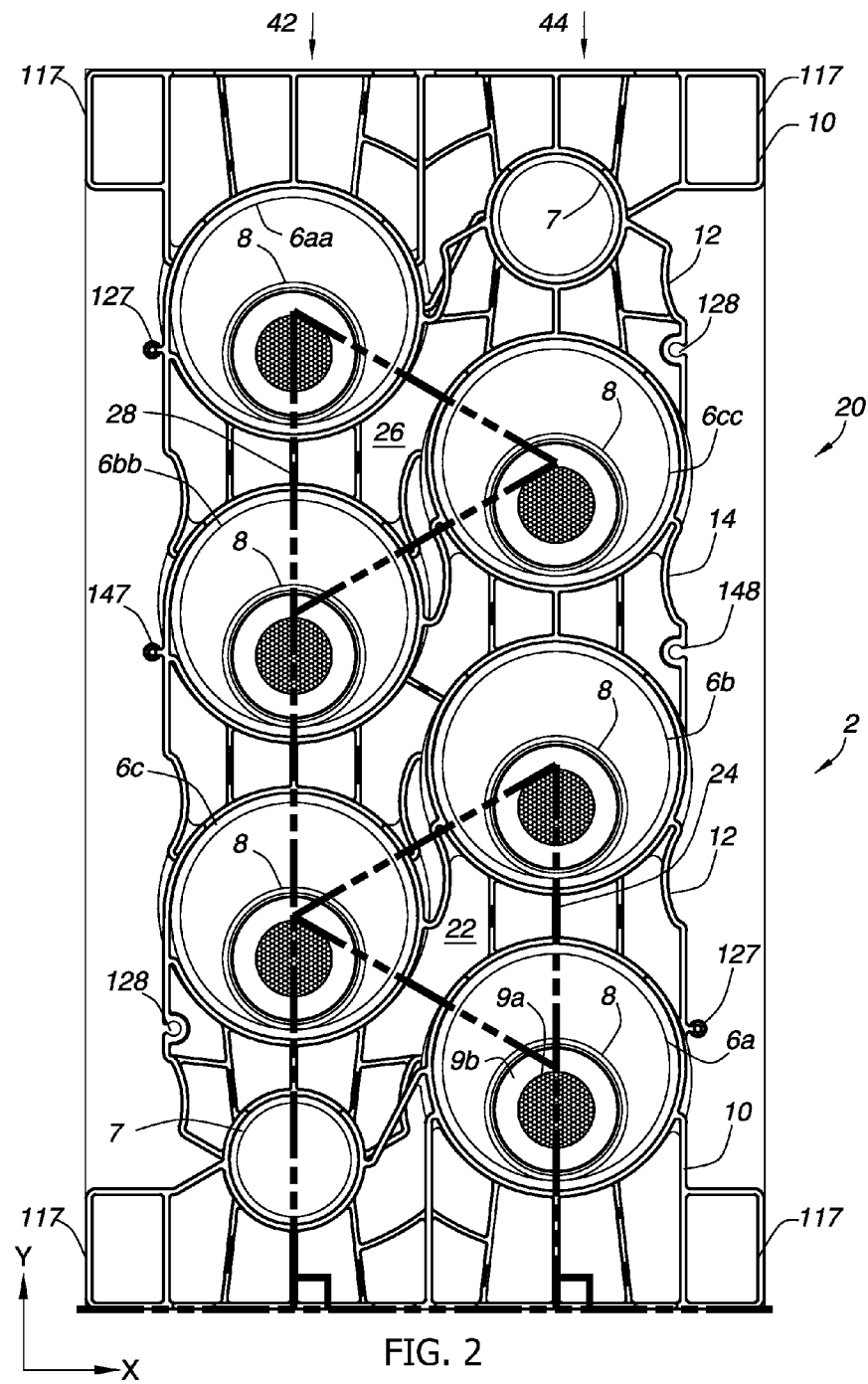
FIG. 2 is an elevation view of the embodiment of FIG. 1.

A side or elevation view of the embodiment of FIG. 1 is depicted in FIG. 2. The arrangement 20 for dual 3-phase power includes the five spacers 10, 12, 14, 12 and 10 arranged in a vertical pattern, with conduits 6, 7 as before. In this side view, each large conduit 6 continues to be depicted with a cable 8 within the conduit. The arrangement is seen to form two vertically aligned columns, a right column 44 with conduits 6a, 6b and 6cc, and a left column 42 with conduits 6aa, 6bb and 6c. Spacers 10, 12, 14, 12, and 10 are designed to hold the conduits in this arrangement, in which half the conduits are aligned vertically in this manner on the left, and the other half is aligned on the right. This view also depicts the slot 128 on the left and tab 127 on the right for spacer 12, as well as tabs 147 on the left and the slots 148 on the right from spacers 14. Inverted spacer 12 is depicted with tab 127 on the left side of the figure, and slot 128 on the right side. These tabs and slots allow for additional spacers to be joined on the left and right of the pictured spacers.

Figure 13:
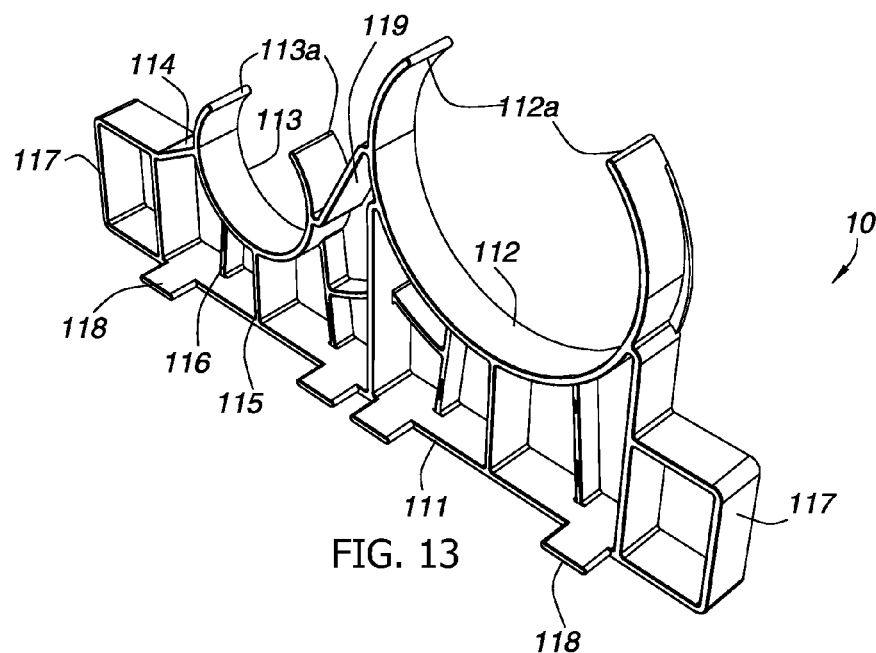
FIGS. 13 and 14 are front and rear perspective views of a first level or bottom spacer for separating conduits for power or communication cables.
Figure 14:
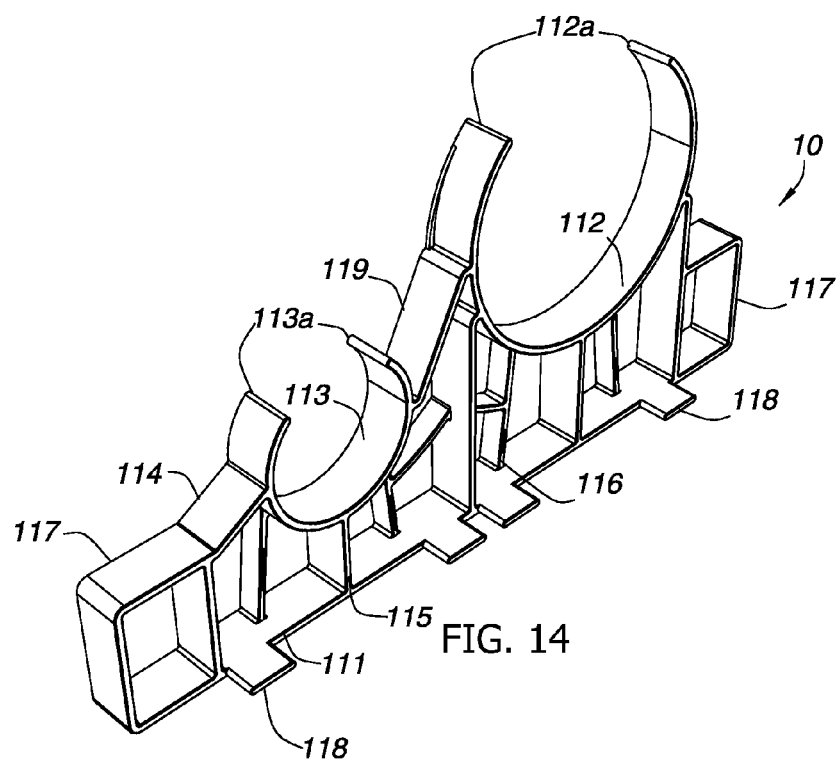
Figure 15:
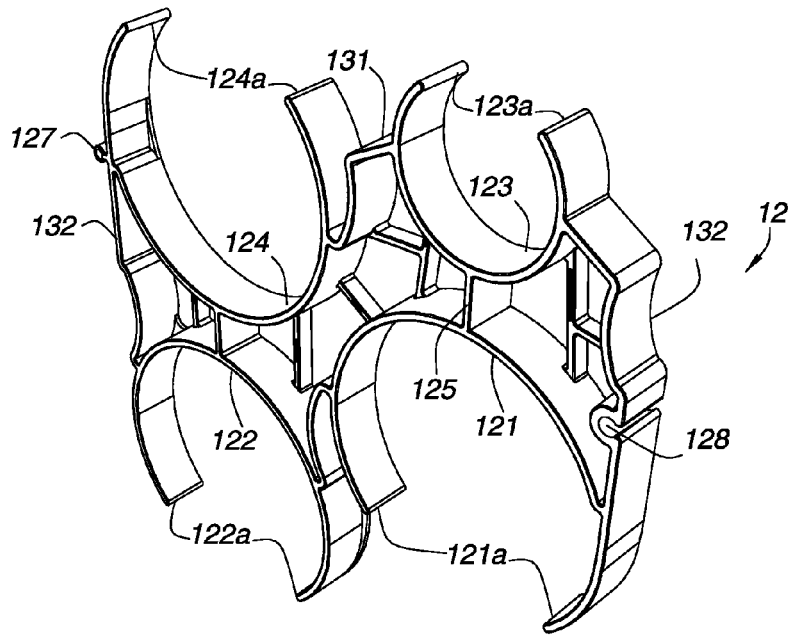
FIGS. 15 and 16 are front and rear perspective view of a level 2 intermediate spacer for separating conduits for power and communication cables.
Figure 16:
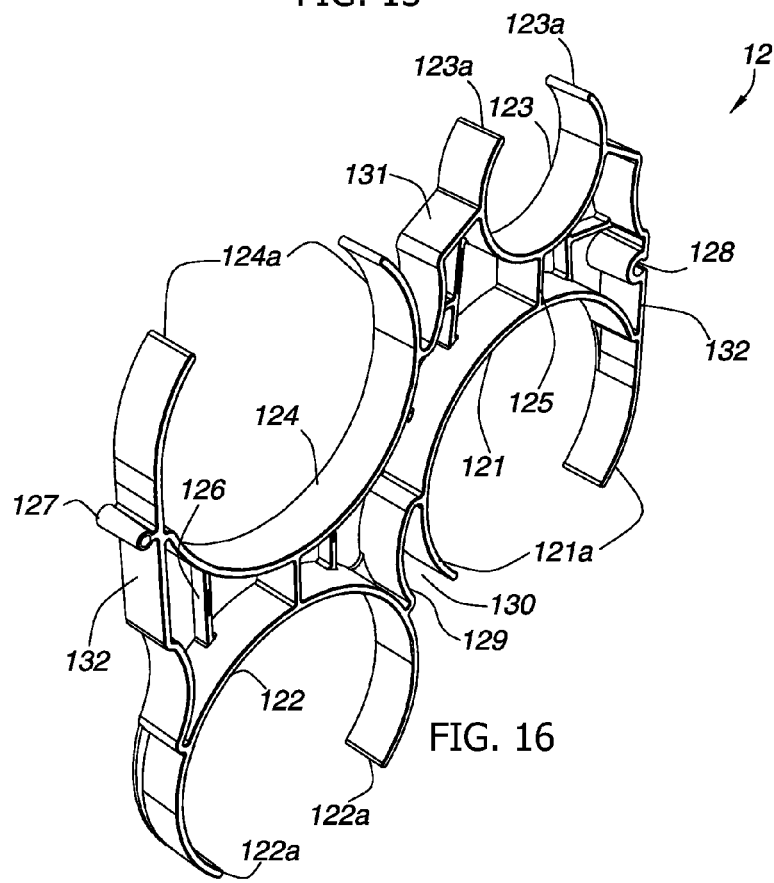

Note that spacer 10 on the top of this dual 3-phase arrangement is the same spacer 10 on the bottom, but spacer 10 on the top has been inverted from the views shown in FIGS. 13-14. Lower spacer 12 is the same as shown in FIGS. 15-16, but in this case lower spacer 12 is inverted from the view shown in FIGS. 15-16.

In this arrangement, the centers of conduits 6a, 6b and 6c form an equilateral triangle 22 (bold-face lines) having a base 24 which is vertical, i.e., perpendicular to the bottom of the trench into which the duct bank is placed. The centers of conduits 6aa, 6bb and 6cc also form an equilateral triangle 26 (also bold face lines) with a base 28 that is also vertical, perpendicular to the bottom of the trench. Triangle 26 is reversed with respect to triangle 22, i.e., it "points" in the opposite direction, but its base 28 is still perpendicular to the trench floor. The other sides of triangles 22, 26 are not perpendicular or parallel to the ground. This spacing is achieved with proper design of the spacers in both the horizontal and vertical directions. In order to preserve the equilateral triangle configuration, the separation between the conduits of the triangle should be symmetrical. That is, the legs of an equilateral triangle all have the same length and the three angles are equal. To preserve equal length in the legs, the separation from the centers of the conduits must be preserved. The vertical separation between conduits 6a and 6b is taken along a line between the centers of conduits 6a and 6b. In the same manner, the separation between conduits 6a and 6c is also taken along a line between their centers, as is the separation between conduits 6b and 6c. This separation is effected by the design of the duct spacers and the placement of the open shape and the upward-facing portions of the spacers. In the embodiment of FIGS. 1-2, a nominal 2.00 inch (5.1 cm) separation is used. Other separation distances may be used.

It will be recognized that when dealing with plane geometry, there are no perfect sides, legs, angles or triangles. Thus, the terms used in this disclosure are approximate. When a form of an equilateral triangle is described or claimed, it should be understood that the form is only an approximation. The prior art of which the assignee is aware primarily describes spacers for regular arrangement of conduits in what may be described as rows and columns. Formation of an equilateral triangle configuration may be thought of as displacing conduits in adjacent columns upward or downward by a distance that is equal to half a diameter of the conduit plus half the spacing between vertically adjacent conduits. A further adjustment horizontally, bringing the columns closer together, brings the centers of appropriate conduits closer to the desired equilateral triangle configuration. Nevertheless, there are no perfect equilateral triangles, and appropriate tolerances should be used when deciding conformance to this form, e.g., ±10 percent on lengths, ±10 degrees on angles. For example, a triangle having corners at 65, 65 and 50 degrees would meet the criteria because all the angles are within 10 degrees of the 60 degrees required for angles of an equilateral triangle. In addition, a rounded corner also falls within the meaning of the word "corner," rather than a sharp-edged corner or meeting of lines or plane surfaces. A triangle with sides of 9.5, 9.5 and 11 cm in length would meet the criteria because all sides are within 10% of a length of 10. The same tolerances or approximations also apply to terms such as "vertical," "horizontal," "perpendicular," "parallel," and the like.

As discussed previously, the cables 8 placed into conduits 6a, 6b and 6c may be phases A-B-C of a first 3-phase power supply, and the cable placed into conduits 6aa, 6bb and 6cc may be phases A-B-C of a second or backup 3-phase power supply. Each "triangular" power supply is thus arranged for phase cancellation. The cables are also arranged, in this embodiment, in a cross-phase cancellation arrangement, with the left column 42 having, from top to bottom, an A-B-C phase arrangement and the right column 44 having a C-B-A phase arrangement. It is not necessary to place the phases this way, but the work cited above from Stoffel demonstrates the effectiveness of this arrangement in reducing the emitted magnetic field. For underground installations, the electric field is zero for all practical purposes.

In the elevation view of FIG. 2, the corners of equilateral triangles 22, 26 mark the centers of the conduits 6. With all conduits 6 having the same diameter and all cables 8 also having the same diameter and placement, the centers of the cables 8 will also define the same equilateral triangles. The only difference would be that these triangles will be moved downwards an inch or two, as can be estimated from the figure. Thus, even though the conduits are not filled, the cables still occupy the same positions relative to one another. The centers of the cables still form an equilateral triangle in both instances. These positions retain the advantages gained by their triangular arrangement, and they also maintain the advantages of their cross-phase positioning in the columns described above.

This arrangement is also advantageous because it allows the most compact arrangement of conduits and consequently cables that is possible. Even with optimal phase cancellation, the magnetic field is highest near the center of the duct bank. The only way to decrease the field is to bring the conductors closer together or to bury the duct bank deeper. For example, an extra foot of depth can reduce the magnetic field by displacing it one foot further from the surface. Of course, deeper trenches cost more because of the extra effort needed to go deeper. The extra depth also makes it harder to upwardly and outwardly dissipate heat generated by the resistance of the cables. The higher the temperature, the higher the resistance, thus requiring a larger cable to reduce heat generation; alternatively, the same cables may be used with lower current. The triangular arrangement also helps because the conduits and thus the cables are closer to the bottom of the trench, due to the more compact placement of the conduits and cables, by means of the spacers, into the trench. An additional reduction in EMF attaches from closer placement of the conductors to each other. It is estimated that movement of the conductors closer to each other by one inch is what helps make possible the 58% reduction in magnetic field discussed above.

Figure 4:
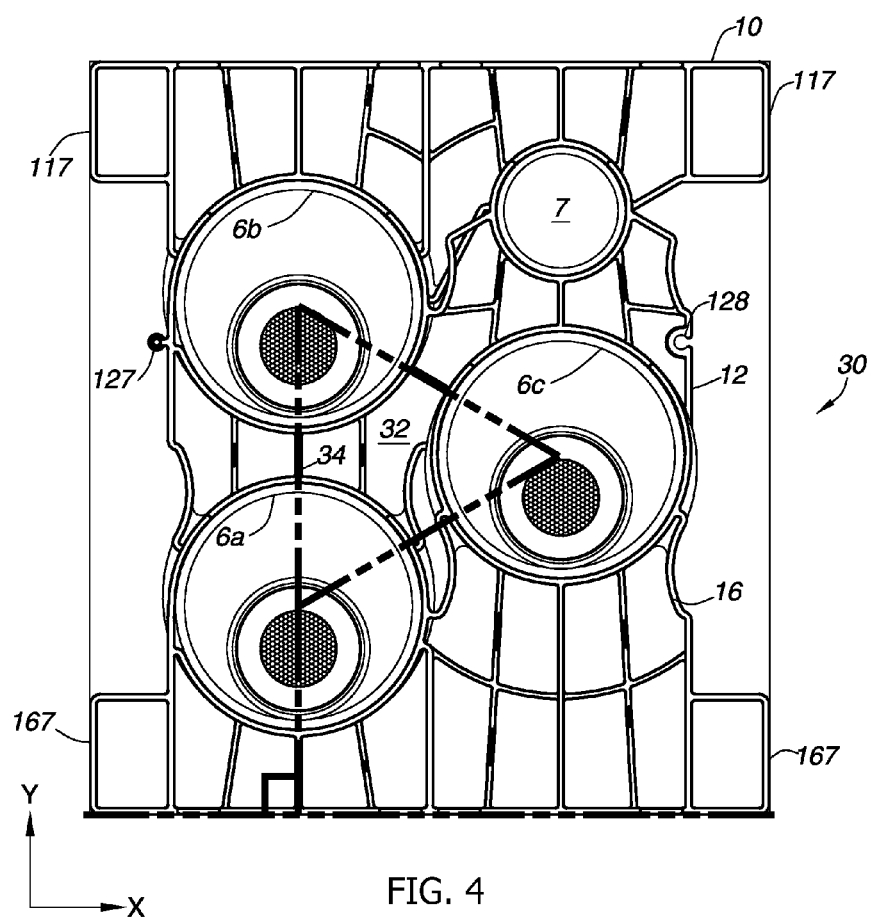
FIG. 4 is an elevation view of the embodiment of FIG. 3.

Several of the many possible embodiments are discussed in this disclosure. Another example is depicted in FIGS. 3-4, which depict perspective and elevation views of an arrangement 30 for a single 3-phase power supply. The situation in FIGS. 3-4 is similar to that of FIGS. 1-2, with a duct bank 2 designed and constructed for placement into a trench 3, then first covered with concrete 4 and then an overburden of earth 5. Arrangement 30 includes a single base conduit spacer 16, a single first level intermediate spacer 12, and an inverted top spacer 10. Base spacer 16 cradles two large conduits 6a and 6c while intermediate spacer 12 cradles a large conduit 6b and a small conduit 7. Inverted top spacer 10 sits atop conduits 6b and 7. Large conduits 6a, 6b, 6c each hold a cable 8, such as the three cables of a 3-phase power transmission line. Just as in arrangement 20, the spacers 16, 12, 10 are staggered horizontally to avoid creation of a shear plane in the encasing concrete. Spacer 12 is inverted from the view shown in FIGS. 15-16, and spacer 10 is also inverted from the views shown in FIGS. 13-14.

The elevation view of FIG. 4 illustrates how the centers of conduits 6a, 6b, 6c form an equilateral triangle 32. Triangle 32 represents the closest possible placement of the cables, consistent with concrete flow and the dissipation of heat generated by the resistance of the cable conductors to the flow of electricity. The base 34 of triangle 32 is vertical, i.e. perpendicular to the bottom of the trench or the ground. Just as in arrangement 20, the other sides of triangle 34 are not perpendicular to the ground. The cable diameter is not the same as the conduit diameter; but so long as the same conduit diameter is used and the same cable diameter is used, the triangle configuration will be preserved for maximum magnetic field cancellation.

Figure 5:
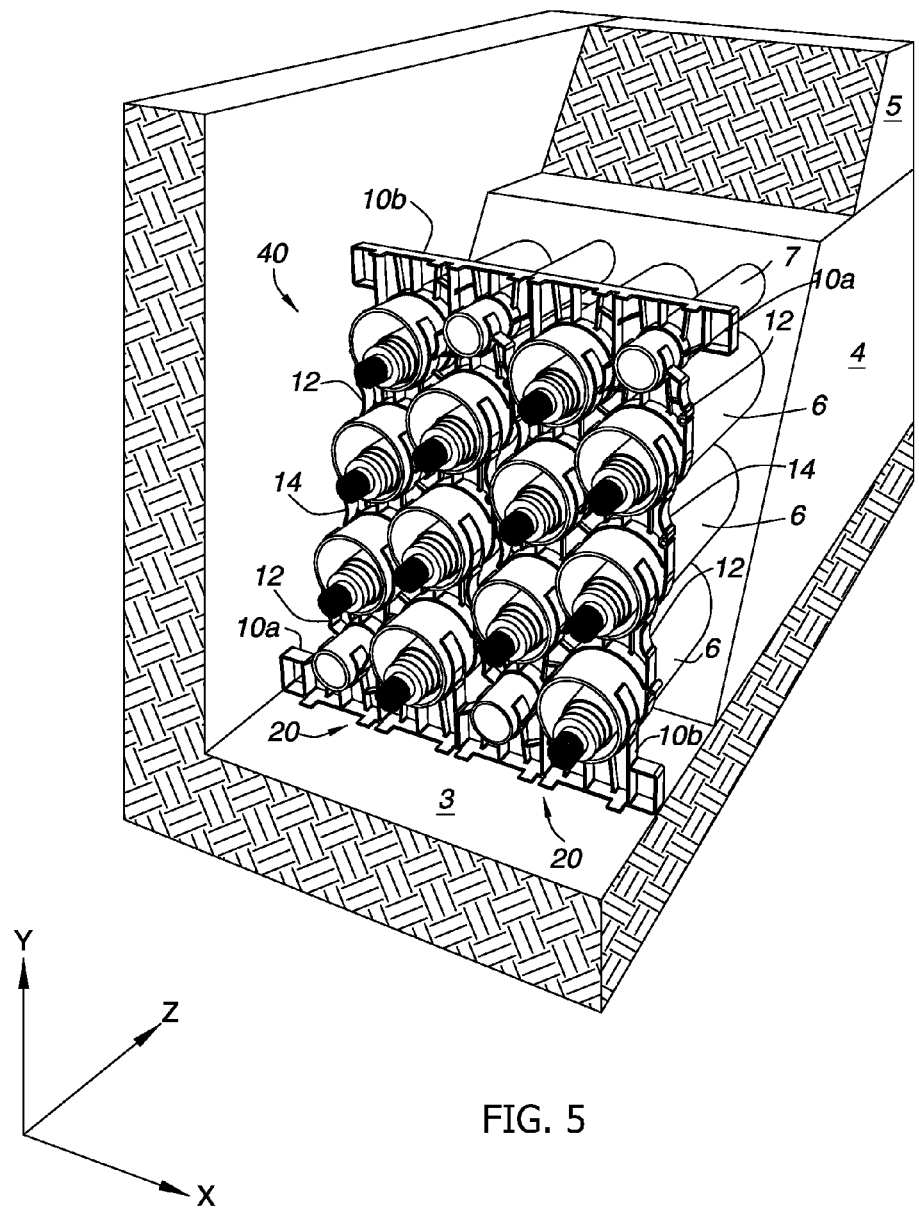
FIG. 5 is a perspective view of a duct bank using duct spacers to separate the conduits of two side-by-side dual 3-phase power lines in a triangular arrangement.
Figure 6:
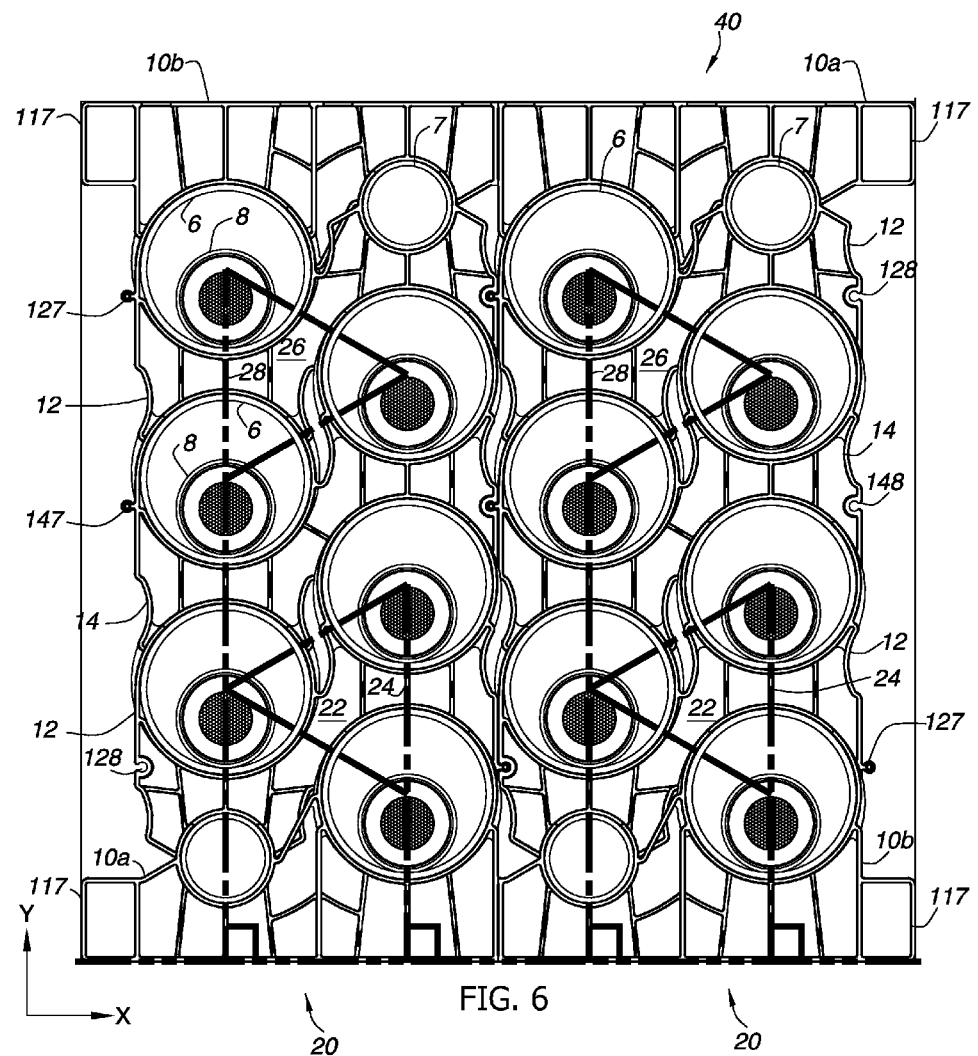
FIG. 6 is an elevation view of the embodiment of FIG. 5.

FIGS. 5-6 depict another embodiment or arrangement 40, which includes two dual 3-phase arrangements 20, arranged side-by-side. In this embodiment, there are two sets of spacers 10a, 12, 14, 12 and 10b, on the left, and spacers 10b, 12, 14, 12 and 10a on the right, each set designed for dual 3-phase power cables. Each set includes six large conduits 6 and two small conduits 7 arranged in a double-triangle formation. As before, each leftward pointing lower triangle 22 has a base 24 that is perpendicular to the bottom of the trench. Each rightward-pointing upper triangle 26 has a base 28 that is perpendicular to the bottom of the trench. In this instance, top and bottom spacers 10a, 10b have been altered to eliminate the center spacer 117 and are now designated as spacers 10a (no right side spacer) or 10b (no left side spacer). If the stacks become wider, the remaining spacer outer spacer 117 may also be eliminated. The top-most spacers 10a, 10b, 12 and 12 are inverted.

As noted previously, spacers 12, 14, 12 each have tabs 127, 147 and slots 128, 148 for joining with other spacers 12, 14, 12, as shown. The dual stacks 20 are shown in FIG. 6 as joined to each other in the center by means of mating slots 128, 148 and tabs 127, 147 from the respective spacers, the center mating slots and tabs un-numbered for clarity. This arrangement helps to keep the duct bank very compact and manageable. However, the left and right sides could also be joined by lateral spacers between the left and right sides, e.g., spacers having a width different from the width of the spacers shown, spacers whose only function is to separate the duct banks laterally without supporting conduits. Examples are side spacer components 117 of spacers 10a, 10b.

Figure 7:
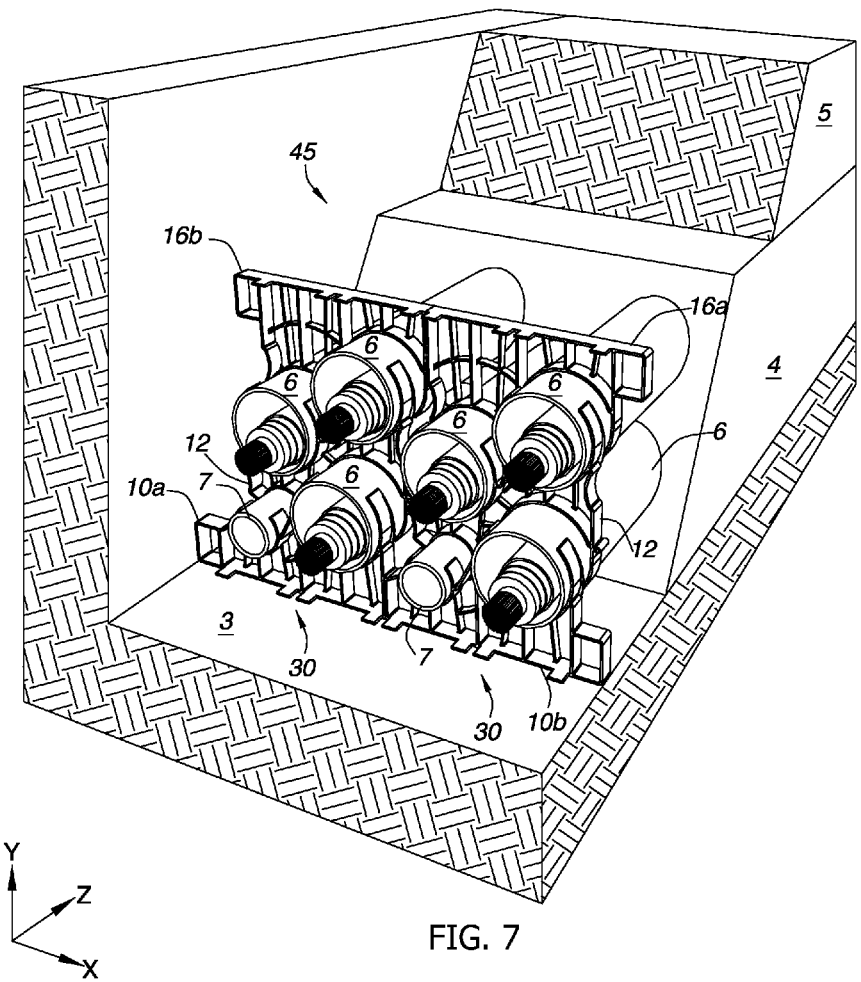
FIG. 7 is a perspective view of a duct bank using duct spacers to separate the conduits of two side-by-side 3-phase power lines in a triangular arrangement.
Figure 8:
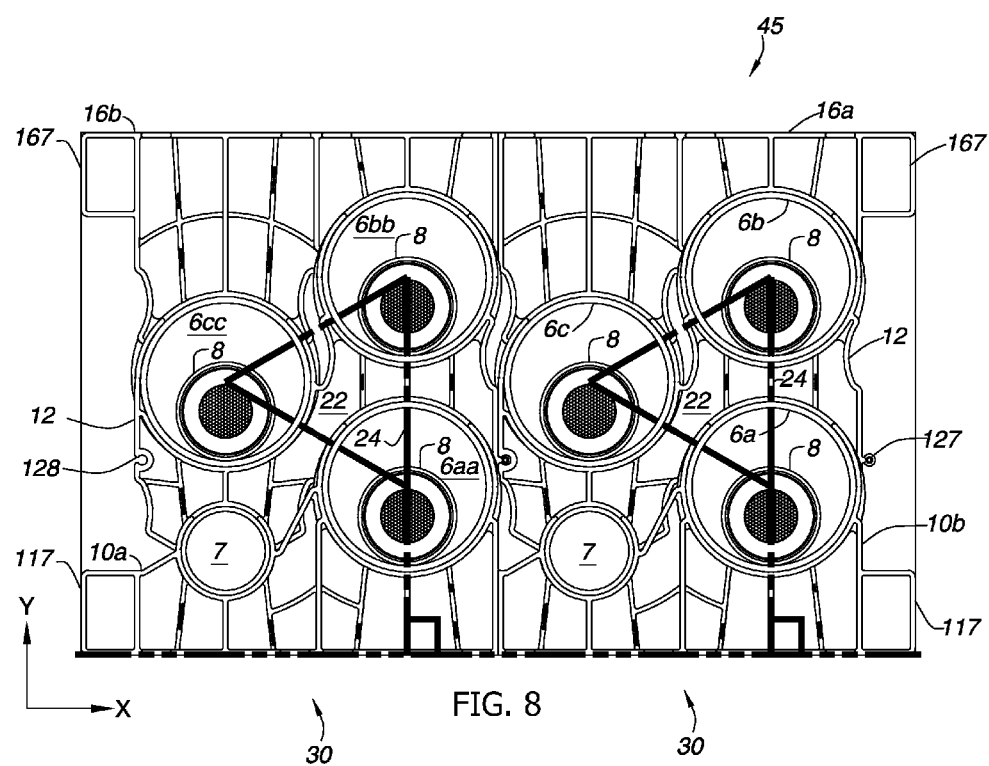
FIG. 8 is an elevation view of the embodiment of FIG. 7.

Another embodiment of two side-by-side 3-phase transmission lines is depicted in FIGS. 7-8. In this arrangement 45, two arrangements of spacers 10a, 12, 16b on the left and 10b, 12 and 16a on the right are used to hold and separate the conduits for two side-by-side 3-phase arrangements 30. The same situation for spacing applies as shown in side view FIG. 8. The centers of conduits 6a, 6b, 6c form an equilateral triangle as before, with the cables 8 in conduits 6a, 6b 6c forming a first 3-phase transmission line. The centers of conduits 6aa, 6bb, 6cc also form an equilateral triangle as before. The cables in conduits 6aa, 6bb are intended to be A and B phase so that they are adjacent the C phase in conduit 6c. While this may not be as effective a cross-phase as in arrangement 20, a cross-phase benefit may be obtained. Tabs 127 and slots 128 may be used to join the spacers 12 as shown. Spacers 10a, 10b and spacers 16b, 16a may be joined by adhesively bonding them, by fasteners, or they may simply be joined as shown as a simple mechanical connection.

Fabricated or Specialty Spacers

The above embodiments use a plurality of carefully designed and manufactured spacers to insure the precise spacing of the conduits, and thus the conductors, for underground power transmission lines. Spacers may also take the form of a single spacer with orifices placed for the same desirable low EMF effects discussed above, as seen here in FIGS. 9-12. Using a horizontal arrangement of single spacers, a duct bank can be preassembled in long sections outside the trench and then dropped into the trench. There is less need for personnel to remain in the trench except for areas where the long sections are joined to each other or where the duct bank is joined to a manhole. With little need for personnel in the trench, it is typically not necessary to shore the trench for installer safety; the entire duct bank assembly and installation may then be completed in considerably less time. With fabricated spacers, special provisions for rebar placement and auxiliary conduits can be added to the router program or other fabrication process with little difficulty.

Figure 9:
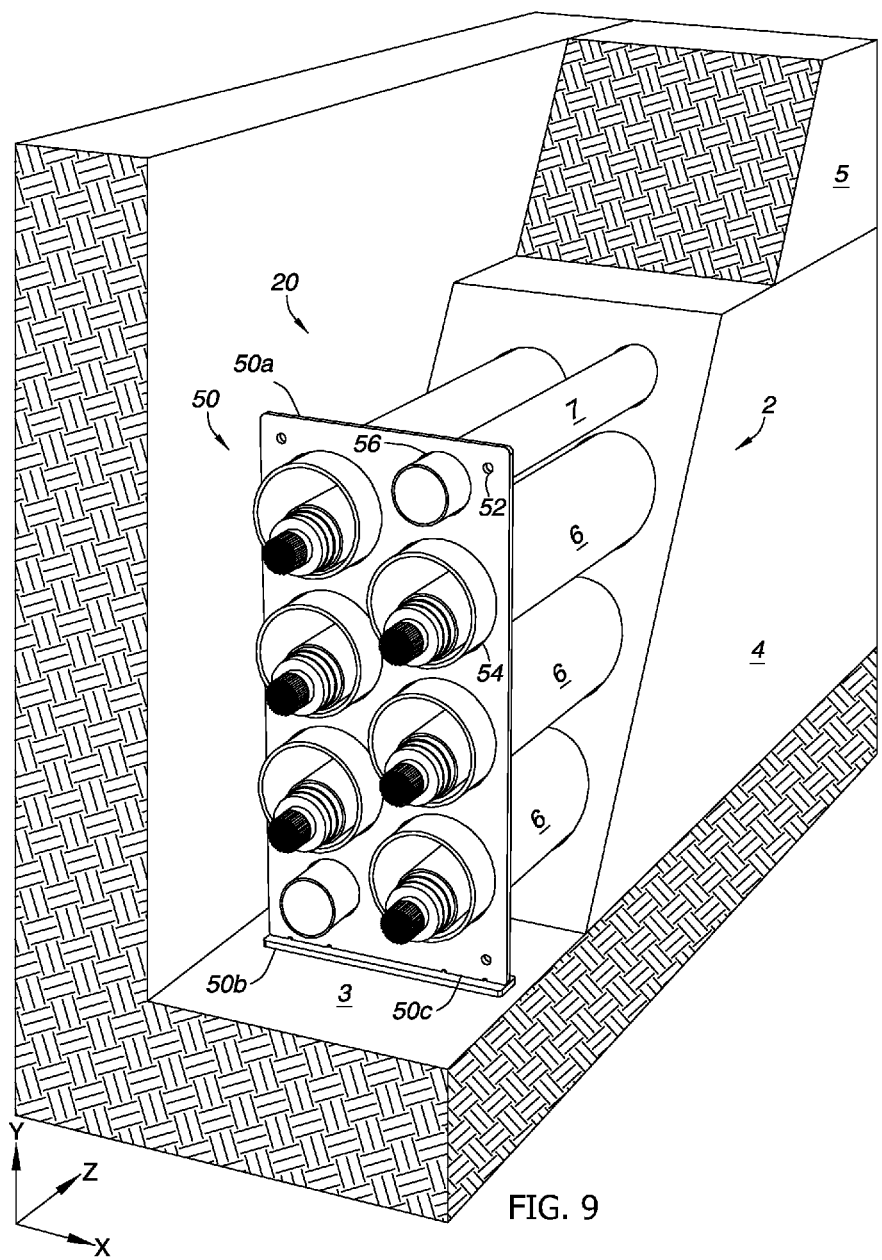
FIG. 9 is a perspective view of a duct bank using a single duct spacer to separate the conduits of dual 3-phase power lines in a triangular arrangement.
Figure 10:
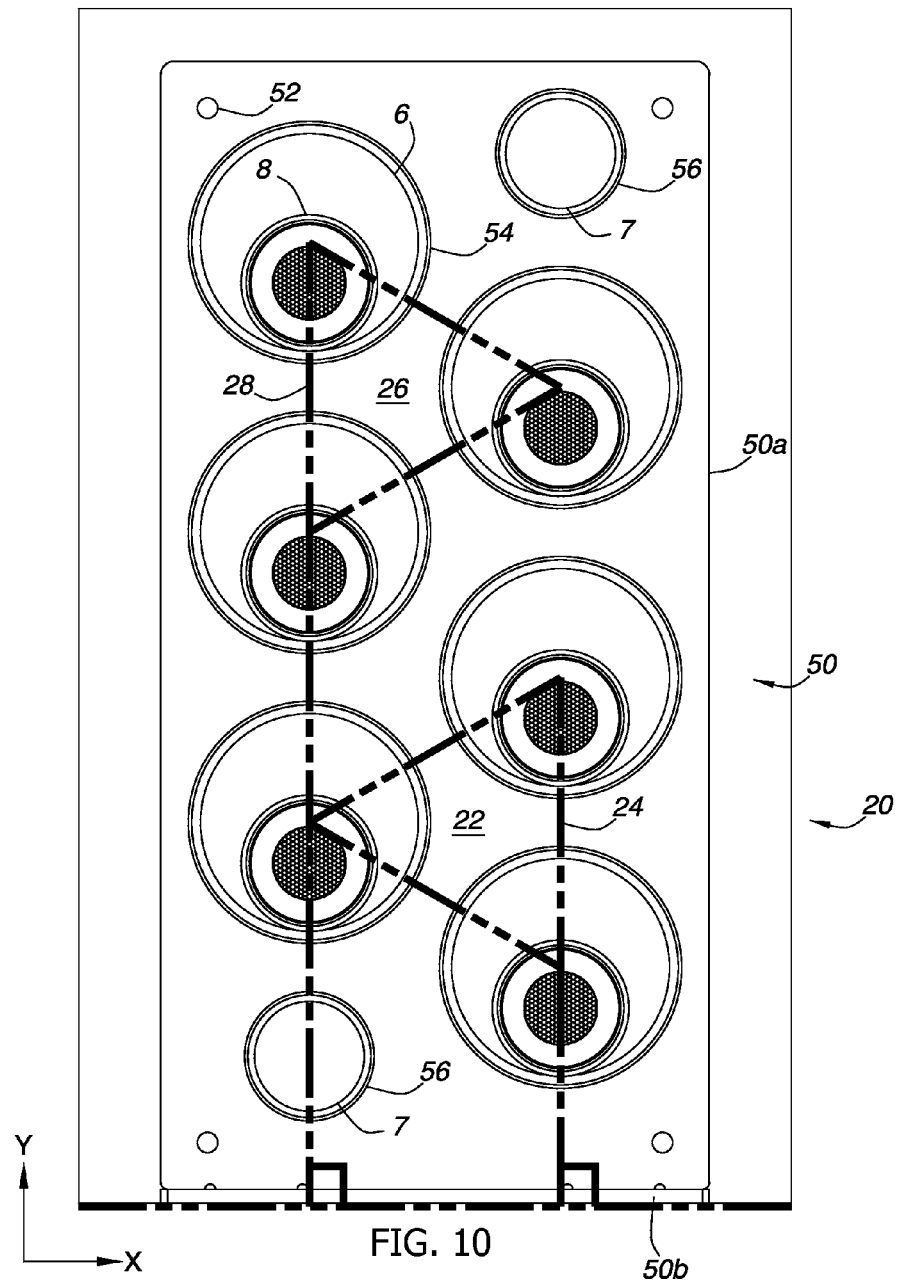
FIG. 10 is an elevation view of the embodiment of FIG. 9.

FIGS. 9-10, for example, depict the same arrangement 20 of dual 3-phase transmission lines discussed above, with conduits and cables spaced in an equilateral triangle 22, 26 arrangement with bases 24, 28 roughly perpendicular to the bottom of trench 3 or the ground. In this embodiment 50, a single spacer body 50a is supported by a spacer base 50b on the bottom of a trench 3. In one embodiment, spacer body 50a is fabricated from 0.5 inch thick HDPE sheet stock using a CNC router. Alternatively, spacer 50a could be injection molded for a lower cost if volume warrants. Spacer body 50a is joined to spacer base 50b with a slit 50c in the base. When the installation is complete, the duct bank 2 is encased in concrete 4 and then covered with overburden 5, such as with earth. Single spacer body 50a may be any suitable width, such as ¼" to ½", although embodiments may use widths that are greater or narrower than these.

Spacer body 50a may be a sheet of plastic or composite material, and it may be fabricated by any conventional plastic processing technique, such as injection molding or compression molding. Extruded sheet stock may also be used, i.e., cut into the desired outline of the spacer and then provided with orifices as shown by drilling, punching, or other material-removal technique. For example, the spacer body 50a may have small utility orifices 52 for handling and stacking. Orifices 52 may also be used to anchor the spacer, and thus the duct bank, to the trench or ground in which it is to be installed, for example by using rebar or other anchors. Large orifices 54 are intended for the 5-in to 8-inch conduits discussed above, while small orifices 56 are intended for the smaller 3-4 inch orifices. The small and large size orifices are not limited by these sizes. The same advantages of close proximity and phase cancellation effects for the conduits apply to single-spacer embodiments as well. Thus, spacer body 50a is intended to support conduits for dual 3-phase transmission lines, just as the multiple spacers shown in FIGS. 1-2 and described above with respect to those figures, including the triangular spacing, the compact spacing, and the phase cancellation effects, including cross-phase cancellation effects.

Figure 11:
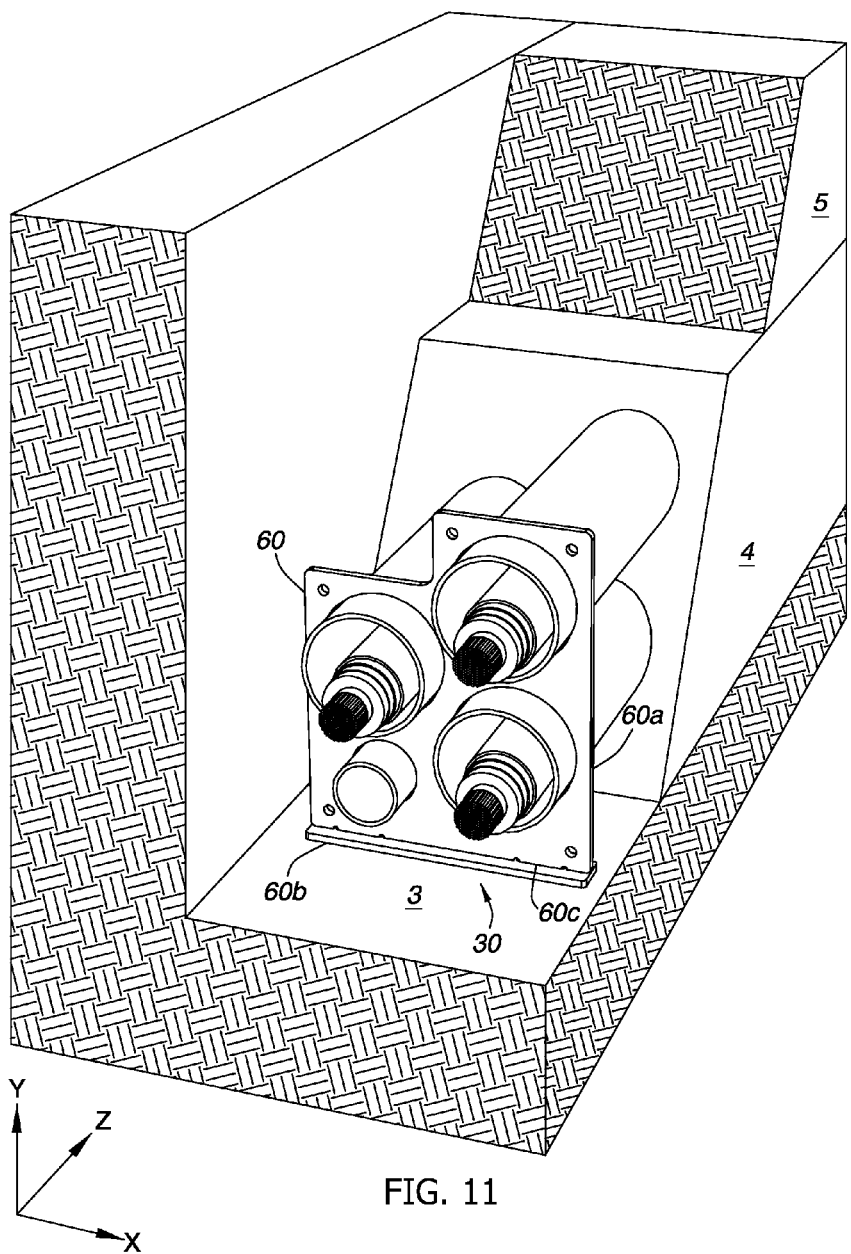
FIG. 11 is a perspective view of a duct bank using a single duct spacer to separate the conduits for a 3-phase power line in a triangular arrangement.
Figure 12:
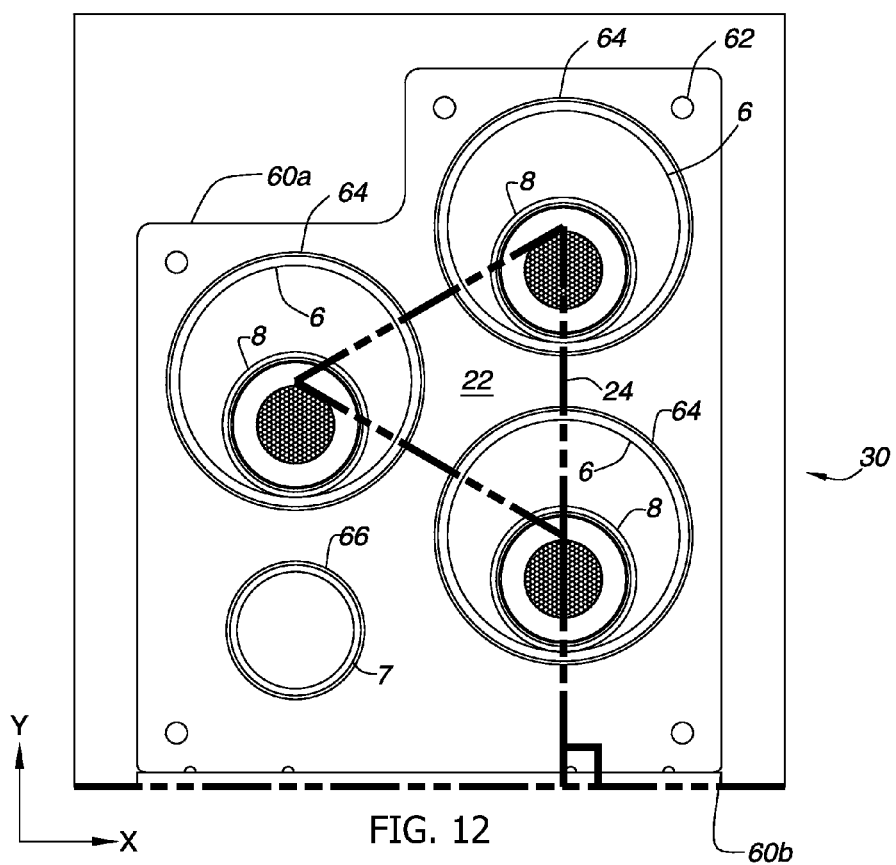
FIG. 12 is an elevation view of the embodiment of FIG. 11.

FIGS. 11-12 depict an embodiment in which a single 3-phase transmission line arrangement 30 is supported by a spacer 60 which includes a spacer body 60a and a spacer base 60b to support spacer body 60a in the bottom of the trench 3, as shown. Spacer body 60a is joined to spacer base 60b by a slit 60c in the spacer base. Spacer body 60a includes 3 large orifices 64 for conduits and a single small orifice 66 for a smaller conduit. Utility holes 62 are also provided. The arrangement of large orifices 64 provides the same triangular spacing 22, 24 discussed above for FIGS. 3-4, as well as the same compact spacing and the phase cancellation effects.

The discussion above has focused on the desired arrangements of conduits. The spacers themselves are now discussed. The first level or base duct spacer 10 was used in many of the embodiments discussed above and is described in FIGS. 13-14. The larger U-shaped body 112 is intended to hold a larger conduit, e.g., 5-8 inch diameter, while the smaller U-shaped body 113 is intended for a small conduit, e.g., 2-4 inch diameter. The spacer includes a base 111, a larger generally U-shaped body 112, a smaller generally U-shaped body 113, feet 118 and side-spacer components 117 for insuring a proper gap between the spacer and the walls of the trench. In one embodiment, spacers 117 are three inches (approx. 76 mm) wide, to insure a proper amount of concrete on sides of the duct bank. Feet 118 add stability to the spacers and to the duct bank when the duct bank is assembled inside or outside the trench. In addition, when spacer 10 is inverted and used as a top spacer, as seen in FIGS. 1-6, feet 118 and base 111 are atop the spacer. The feet and base provide an integral and handy concrete gauge when the concrete pour is made—when the feet and base or concrete gauges are covered, the concrete fill is sufficient. This also applies to the feet 168 and base 163 of spacer 16, depicted in FIGS. 19-20 below.

The U-shape bodies 112, 113 form an arc, a majority of a circle. U-shaped body 112 includes ears, extensions or upper portions 112a while U-shaped body 113 includes ears, extensions or upper portions 113a. In one embodiment, the arc is about 270°, centered on the bottom of circular shape. In other embodiments, the arc may be more or less than 270°, so long the arc is sufficient to hold the conduits in place. This shape also applies to the U-shaped bodies described in spacers 12, 14 and 16 below. The upper portions or sides of the arc, the arms, are intended to act as snap-fits when the conduits are inserted into the spacers. These upper portions of arms or U-shaped bodies are also apparent in the spacers 12, 14 and 16 of FIGS. 15-20 below. The bodies need not be U-shaped, but may be any suitable shape, such as a rounded square or other geometry, so long at the body is open to accept a conduit.

The bodies are supported above the base with ribs, including buttress 114, full-width ribs 115 and half-width ribs 116. There is also what may be termed a horizontal rib 119, which acts as an upper support between the two generally U-shaped bodies 112, 113. Rib 119 allows U-shaped body 112 to flex when a pipe or conduit is assembled into the spacer. The spaces on the either side of rib 119 act as reliefs that permit the rib to move downwardly when receiving the pipe or conduit and then to flex back upwardly, at least partially, after assembly. In addition to acting as a base spacer, spacer 10 can function as a gauge for the amount of concrete or other filler added to the duct bank. The full width rib 115 is about 1.5 inches (about 4 cm) long in one embodiment. If this spacer is installed upside-down on the top tiers of conduits, installers know they have placed the proper amount of concrete into the trench when the spacer is just covered. The spaces between the top and bottom of spacer 10, and spacers 12, 14 and 16, have relatively large open areas and present low resistance to the flow of concrete through the spacer. This large open area reduces the possibility of shear planes in the concrete duct back.

Spacer 10 differs from the other spacers depicted below in that spacer 10 does not have tabs and slots on its sides for horizontal joining with other spacers 10. As shown in FIGS. 6 and 8 above, horizontal joining of duct banks may be accomplished by using the tabs and slots of the other spacers and if necessary, by using adhesive bonds or fasteners on these lower lever spacers. The joining may be aided by removing side space component 117 or 167 on the appropriate side, as shown in FIGS. 5-8 above. In one embodiment, the spacers 10, 12, 14 16 are designed so that spacers 10 and 16 "fit" horizontally as shown in FIGS. 5-8 with joined spacers 10 and 16, using the tabs and slots of spacers 12, 14. In this description, spacer 10 is designated as spacer 10a or 10b when one of the side space components has been removed, e.g., cut off, and spacer 16 is designated as spacer 16a or 16b when one of the side space components has been removed.

The second level intermediate spacer 12 is depicted in detail in FIGS. 15-16. This spacer is intended for use in an upside-down orientation to sit upon the conduits placed into the base spacer 10, and is also designed to hold and support two large conduits. Spacer 12 includes a smaller upward-facing generally U-shaped body 123 with extensions 123a for placement atop the smaller conduit placed into spacer 10 and a larger upward-facing generally U-shaped body 124 with extensions 124a for placement atop the larger conduit placed into spacer 10. Inner and outer supports 131, 132 help to retain dimensional integrity between U-shaped bodies 123, 124 and to help support the conduits when placed therein. The spaces on the either side of rib 131 act as reliefs that permit the rib to move downwardly when the spacer is receiving the pipe or conduit and then to flex back upwardly, at least partially, after assembly. Spacer 12 also includes a first downward-facing arcuate body 121 with extensions 121a for accommodating a larger conduit placed therein, a second downward-facing arcuate body 122 with extensions 122a, also for accommodating a second larger conduit placed therein, and inner support 129 between U-shaped bodies 121, 122, with space 130 between support 129 and U-shaped body 121. The arcuate bodies 121, 122 each form an arc, a shape in the form of a partial circle, in this embodiment about 270°. Other embodiments may have different amounts of coverage, so long as the opening or arc is sufficient to provide support for the spacer above the conduits on which the spacer rests, and so long as the spacer is able to provide support for the conduits to be placed into the spacer. This description also applies to the down-ward facing arcuate bodies in spacers 14 and 16 below. While the several bodies of the spacer are described as "arcuate," they may be any suitable open geometry, such as an open rounded polygon, square, pentagon, and so forth.

A series of full-width ribs 125 and half-width ribs 126 provides support between the upper and lower portions. Spacer 12 also has tapered tabs 127 and slots 128 for joining adjacent spacers. As better seen in FIG. 16, tabs 127 are tapered in the direction shown, with the back having a larger diameter tapering to a smaller diameter in the front. Slots 128 are also tapered in the same direction. The downward-facing generally U-shaped bodies 121, 122 are spaced for the proper separation, horizontal and vertical, so that when conduits are placed into them, the centers of the conduits form an equilateral triangle. That is, conduits placed into U-shaped bodies 122 and 124 will be vertically aligned. Centers of conduits placed into U-shaped bodies 121, 122 and 124 will form an equilateral triangle.

Figure 17:
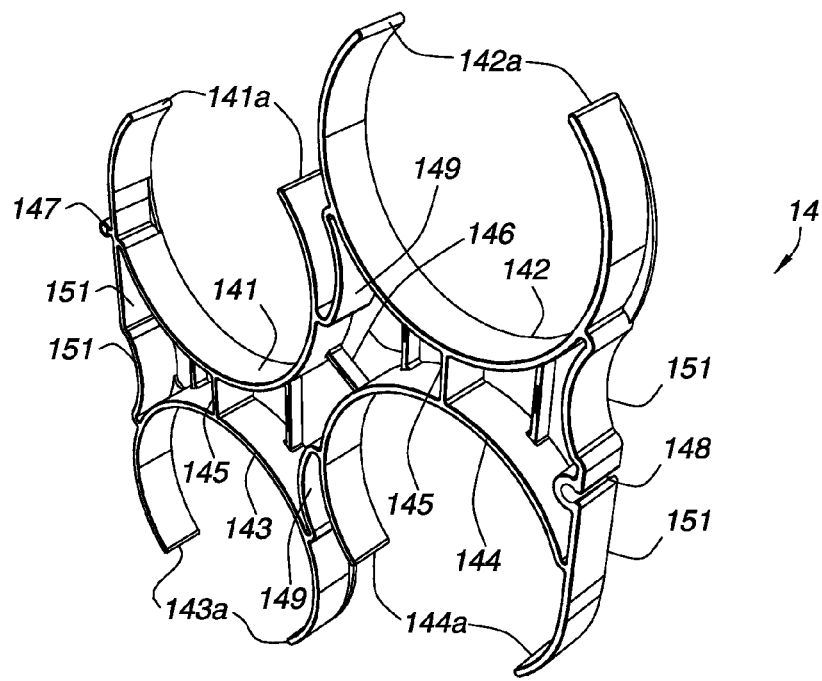
FIGS. 17 and 18 are front and rear perspective views of a level 3 intermediate spacer for separating conduits for power or communication cables.
Figure 18:
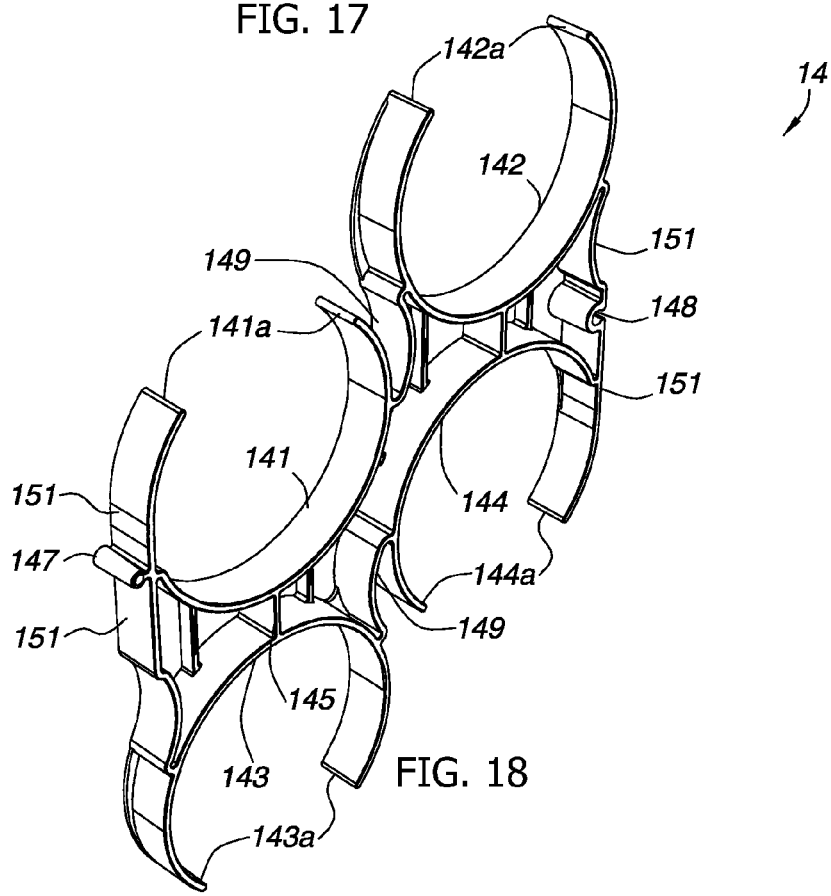

Third level intermediate spacer 14 is described in detail in FIGS. 17-18. Spacer 14 includes a lower upward-facing generally U-shaped body 141 and an upper generally U-shaped body 142. The spacer also includes a lower downward-facing arcuate body 143 under U-shaped body 141 and an upper downward facing arcuate body 144 under U-shaped body 142. The generally U-shaped bodies 141, 142, 143, 144 also include ears or extensions 141a, 142a, 143a and 144a which assist the U-shaped bodies in retaining the conduits fit into the spacers. The U-shaped bodies are joined to the arcuate bodies by full width ribs 145 and half-width ribs 146, along with support ribs 149 between the upper and lower support bodies. The spaces on the either side of rib 149 act as reliefs that permit the rib to move downwardly when U-shaped body 141 or 142 is receiving the pipe or conduit and then to flex back upwardly, at least partially, after assembly.

Spacer 14 also has tapered tabs 147 and slots 148 for joining adjacent spacers. The upward-facing generally U-shaped bodies 141, 142 are spaced for the proper separation, horizontal and vertical, so that when conduits are placed into them, the centers of the conduits form an equilateral triangle. Conduits placed into U-shaped bodies 141 and 142 will be vertically aligned with conduits placed into U-shaped bodies 121 and 122. As noted, additional levels of conduits may be added to the duct bank by using additional levels of third intermediate spacer 14. As previously, while the bodies of spacer 14 are described as arcuate or U-shaped, any suitable open space or geometry will suffice.

Figure 19:
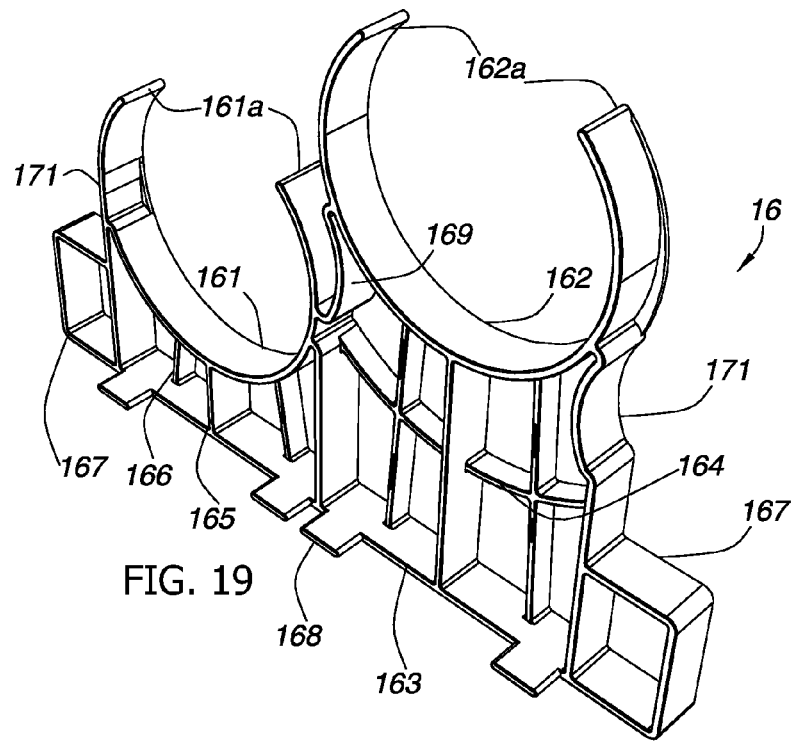
FIGS. 19 and 20 are front and rear perspective views of a top level spacer for separating conduits for power or communication cables.
Figure 20:
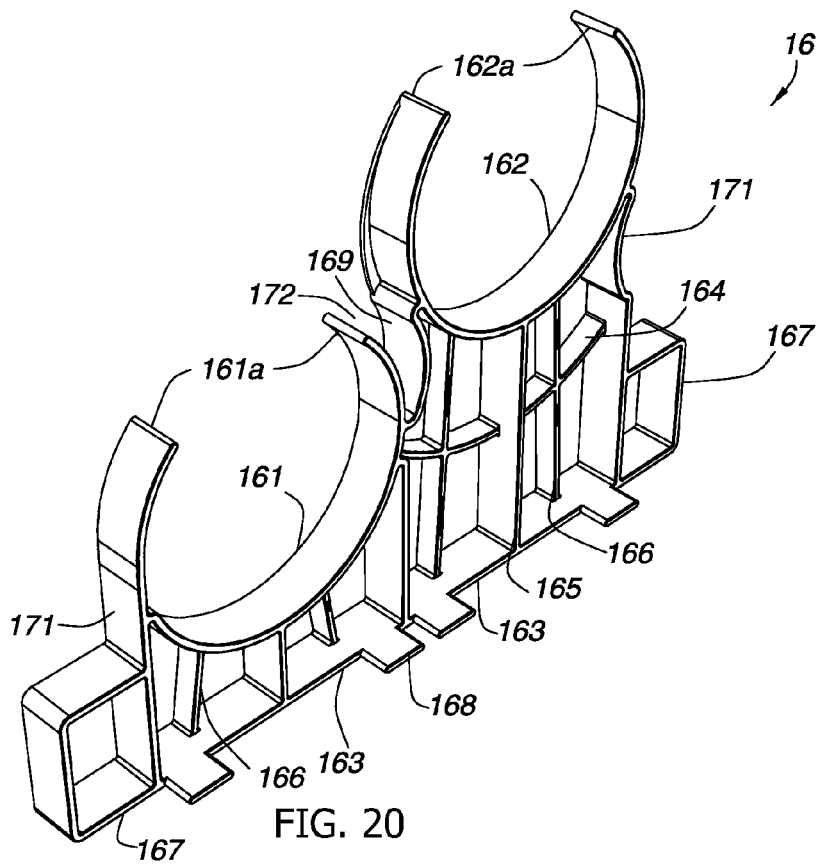

When the desired number of layers is almost reached, level four or top level spacer 16 may be used to support the top row of conduits. Details of top spacer 16 are shown in FIGS. 19-20. The spacer includes a lower upward-facing generally U-shaped body 161 with arm extensions 161a and an upper upward-facing generally U-shaped body 162 with arm extensions 162a, similar to the 270° arc described above for other spacer embodiments. The generally U-shaped bodies are supported laterally by upper support 169. U-shaped bodies 161, 162 are intended for holding large conduits and may be used as a bottom spacer, as shown in FIGS. 3-4, or may be inverted and used as a top spacer, as shown in FIGS. 7-8. The U-shaped bodies are joined to the arcuate portions with full-width ribs 165 and half-width ribs 166. Spacer 16 also includes a spacer base 163, transverse ribs 164, side spacer components 167 and feet 168. Side spacer components 167 are typically used to insure a desired minimum width of concrete for the finished duct banks. In one embodiment, side spacer components 167 are about three inches (about 76 mm) wide. Other dimensions may be used. Spacer 16 is designated as spacer 16a or 16b when one of the side spacer components is removed, e.g., by cutting off the spacer. A center of conduits placed into the generally U-shaped bodies 161, 162 are intended to directly align with the U-shaped bodies 121, 122 of spacer 12 of spacer 10 to form an equilateral triangle, as shown in FIGS. 3-4 and 7-8.

It has been discovered that the profile of the generally U-shaped bodies of spacers 10, 12, 14, 16 has an unexpected benefit in assembling duct banks. Assembly of the spacers into duct banks is discussed with reference to FIGS. 21-24. In FIG. 21 a conduit 6c is about to be placed into the lower upward-facing generally U-shaped body 121 of spacer 12. Conduit 7 has already been placed into smaller generally U-shaped body 113 of base conduit spacer 10 and conduit 6a has been placed into the larger generally U-shaped body 112 of base conduit spacer 10. FIG. 22 is a close-up of the circled area of FIG. 21. The close-up view shows that upper portion or ear 121a of the right hand side of U-shaped body 121 is in the path of progress of conduit 6c on its path to installation.

Also shown in FIG. 22 is inner support 129 between U-shaped bodies 121, 122 and supporting rib 126, a half width rib. In some embodiments, U-shaped bodies 121, 122 provide about 270 degrees of coverage for the conduit. Thus, the upper portions or ears 121a, 122a, will have to move if conduits are to be installed. Note the space or void 130, i.e., a relief, in the area between ear 121a and inner support 129.

The needed movement is depicted in FIGS. 23-24. As the conduit is lowered, the conduit urges aside ear 121a as seen in FIG. 23. The detail of the movement is depicted in FIG. 24, a close-up of the circled portion of FIG. 23. In FIG. 24, the downward movement of conduit 6c has pushed aside ear 121a. This movement is made possible by the flexing of inner support 129. Movement of ear 121a and inner support 129 considerably reduces the size of the space or void 130, as shown. If inner support 129 does not yield, the upper support may be broken or installation will not be possible. With this design, upper portions or ears 121a are easily moved aside, and then conduit reaches full depth, the ears 121a can snap back into place, much as a snap-action or snap-fit assembly works. This design with moveable ears and flexible supports is part of each of spacers 10, 12, 14 and 16.

Present designs call for inner support 129, and the supports for the other spacers, to be full-width supports, extending across the full depth of the U-shaped bodies 121, 122 in spacer 12, along coordinate axis Z in FIGS. 7, 15 and 16. The full depth allows for uniform support across the depth of the spacer. The thickness of support 129, as well as the material used, will then determine its ability to flex and allow entry of the conduit, while retaining sufficient rigidity to provide good support to the conduit in the duct bank. Previous designs included a tab at about 90° at the terminus of the upper portion or ear 121a. The tab in earlier designs prevents entry of the conduit while this design allows for easy yet secure assembly of the duct bank.

While FIGS. 9-12 depict useful embodiments, there are many other embodiments. These fabricated single-body spacers may have tabs and slots, i.e., joining members, for assembly with other spacers in a horizontal direction. In addition, the single body spacers may be combined with suitable additional slotted supports, horizontal and vertical, to support larger combinations of conduits. In some embodiments, single body spacers may have vertical slots and vertical tabs as well, for assembling multi-tiered banks of spacers for use in a multi-level duct bank. These single-body or fabricated spacers may have openings or orifices slightly larger than the expected diameter of the pipe or conduit which is expected to fit within the opening.

In one example, as show in FIGS. 11-12, 8-in nominal conduits have an actual 8.625 in diameter, approx. 21.9 cm, and are separated vertically by about 2.00 in or 5.1 cm. In addition, spacers for this size conduit typically need to be somewhat larger, e.g., about 8.875 in (22.54 cm) to allow for ease of assembly. For 4-in nominal conduits, the actual outer diameter is about 4.500 inches and the spacer hole diameter may be about 4.750 inches. A first fabricated spacer 60 may have a spacer body 60a and a spacer base 60b. The small conduit space is nearest the bottom of the trench and has about 3.0 inches (about 7.6 cm) clearance above the bottom of the trench. The center of the conduit orifice is about 5.3 inches above the bottom of the trench, with about 3.0 inches for concrete. The center of the first larger-diameter opening, adjacent the small orifice, is about 8.60 inches above the bottom of the trench and includes about 4.19 inches (about 10.6 cm) clearance for concrete fill. The third large orifice is centered above the first large orifice, with the center of the third large orifice at about 19.02 inches (about 48.3 cm) above the ground and with about two inches (about 5 cm) vertical clearance separating the orifices. The second large diameter orifice is located adjacent the first and third orifices and centered directly above the small diameter orifice. The second large diameter orifice has about two inches (about 5 cm) vertical clearance above the small diameter orifice, the center of the second diameter orifice at about 13.81 inches (about 35 cm) above the trench bottom. Additional horizontal conduits may be added in the same manner as shown in FIGS. 9-10. Of course, different dimensions and tolerances apply for spacers for different conduits.

The duct spacers are may be made from composite materials or plastic materials. These may include injection molded, compression molded or fabricated spacers. For purposes of this disclosure, plastic means a thermoplastic, thermoset, reinforced thermoplastic or reinforced thermoset material. For example, glass-filled nylon, LDPE or HDPE materials may be injection molded to form the spacers described herein. ABS or high-impact polystyrene (HIPS) may be injection molded to form the spacers. Alternatively, sheet stock of nylon, polyethylene or styrene materials may be cut and machined to form the spacers. Other suitable plastic or composite materials may be compression molded to form the spacers described herein.

As noted earlier, significant reductions in EMF may be achieved in 3-phase power transmission by placing the conductors near each other in a triangular or delta configuration. The emissions of each phase are sufficiently different that significant self-cancelling effects may be achieved. Studies conducted by Argonne National Laboratories demonstrated the EMF reduction that can be achieved by varying the placement of the conductors, as discussed above in Stoffel (1994). The study compared magnetic fields resulting from transmission of 230 kV power at 500 A for different configurations of the three conductors for overhead transmission lines. A standard vertical construction had a magnetic field of about 79 mG directly beneath the conductors. A triangular configuration yielded a magnetic field of about 59 mG and a dual 3-phase arrangement (dual split phase) using six conductors had a magnetic field of about 34 mG. The triangular configuration thus had a reduction of about 26% while the dual split phase had a reduction of about 58% directly beneath the lines, with greater comparative reductions at greater distances. The data is presented here in Table 1.

TABLE 1

Magnetic field in mG or % reduction beneath overhead power lines for 230 kV, 500 A

| Config-uration | Vertical | Triangular | Reduction, % | Dual Split-phase | Reduction, % |
|---|---|---|---|---|---|
| Result | 79.0 mG | 58.6 mG | 26% | 33.5 mG | 58% |

From Argonne National Labs, Stoffel 1994

Figure 25:
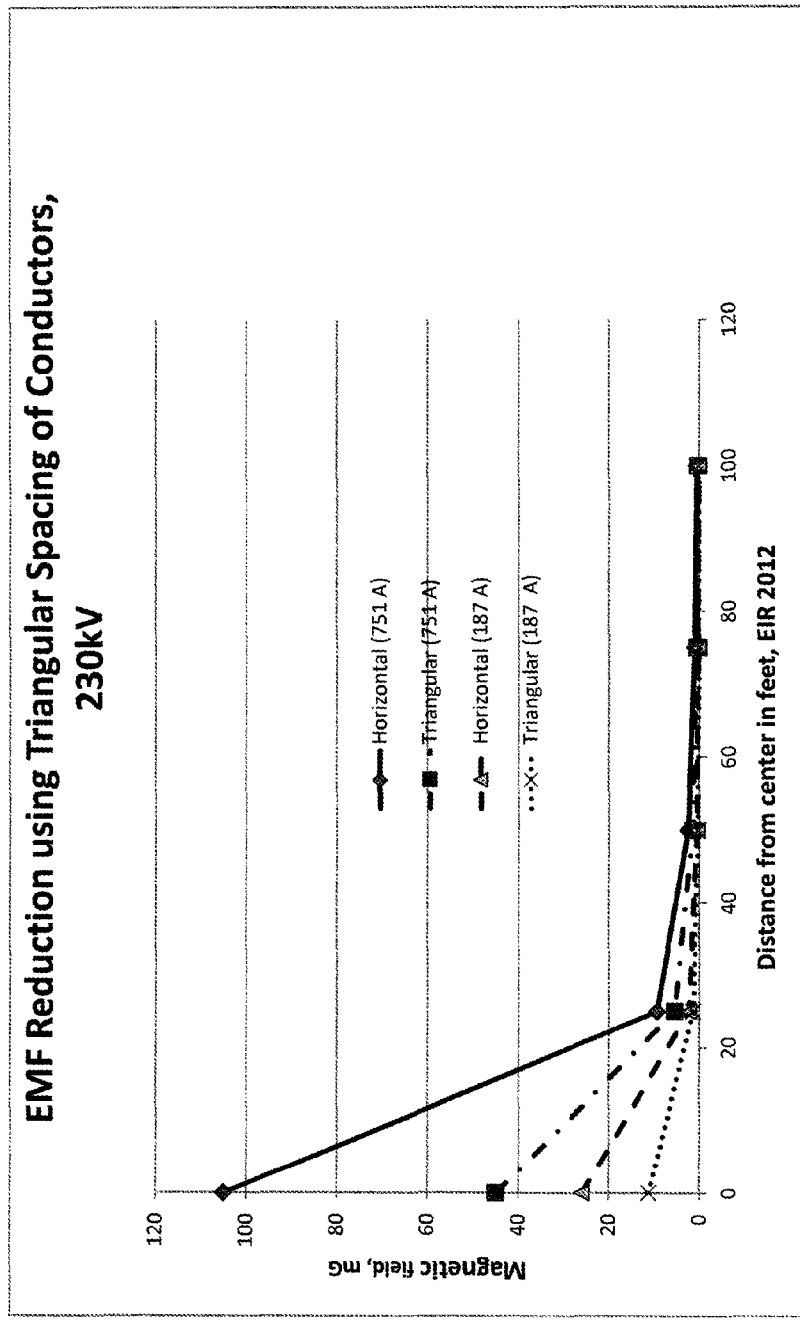
FIG. 25 is a chart depicting EMF reduction using triangular spacing of conduits for 3-phase power transmission lines.

Additional studies conducted for the Los Angeles Dept. of Water and Power showed that approximately a 57% reduction in the magnetic field above the ground and closest to the conductors was possible. *Draft Environmental Impact Report*, Los Angeles Dept. of Water and Power, SCH#2009091085, City Clerk Filing #EIR-12-007-WP, March 2012 ("EIR 2012"). This phenomenon is seen in FIG. 25 for 230 kV 3-phase power, for both 751 amps (loading not exceeded 95 percent of the time) and 187 amps (average loading), for underground installations. The reduction at 751 amps was from approximately 105 mG (milligauss) at the center of duct bank in a horizontal or side-by-side configuration, to about 45 mG when a triangular or delta configuration was used. This represents about a 57% reduction. Similar reductions were seen for 187 amps, from approximately 26 mG in a horizontal configuration to about 11 mG for the triangular configuration, which is also a 57% reduction. The data are presented in Table II. Readings are taken at about 1 m above the ground. In both the conventional and the triangular configurations, the top of the duct bank was about 3 ft (about 1 meter) below grade. In general, phase cancellation effects increase the closer the conductors are placed together. The triangular configuration used cables placed about one inch closer than the conventional spacing between cables.

TABLE II

Magnetic field in mG at stated horiz. distance or reduction at stated Amps for 230 kV

| Configuration | 0 ft | 25 ft | 50 ft | 75 ft | 100 ft |
|---|---|---|---|---|---|
| Horizontal 751 A | 104.76 | 9.34 | 2.5 | 1.13 | 0.64 |
| Triangular 751 A | 45 | 5.43 | 1.49 | 0.67 | 0.38 |
| Horizontal 187 A | 26.08 | 2.33 | 0.62 | 0.28 | 0.16 |
| Triangular 187 A | 11.21 | 1.35 | 0.37 | 0.17 | 0.09 |
| Triangular 751 A % reduction | 57 | 42 | 40 | 41 | 41 |
| Triangular 187 A % reduction | 57 | 42 | 40 | 39 | 44 |

From EIR 2012

The data in Table II may be interpreted several ways, but one useful way is to compare the configurations to see the reduction in magnetic field at horizontal distances from the center of the duct bank. Table II is also constructed to show the considerable reduction in magnetic field from the triangular configuration as compared to the standard horizontal configuration at all distances from the duct bank.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments are described herein, including the best mode known to the inventors for carrying out the invention. Variations of those preferred embodiments may become apparent to those of ordinary skill in the art upon reading the foregoing description. Skilled artisans will use such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A conduit spacer, comprising:
    a lower portion including a horizontal base and at least two conduit support bodies supported above the base, each conduit support body having an open end extending away from said base, the lower portion further comprising a supporting rib between the at least two conduit bodies and attached to each of the at least two conduit support bodies; and
    an upper portion including two conduit support bodies having open ends extending downwards and a conduit support body having an open end extending upwards, wherein the two conduit support bodies extending downwards and the conduit body having an open end extending upwards of the upper portion are adjacent one another and in contact with one another through a plurality of ribs of the upper portion, centers of the three bodies approximating an equilateral triangle with a base in a nominally vertical direction,
    wherein the two conduit support bodies of the upper portion having open ends extending downwards and the conduit support body of the upper portion having an open end extending upwards are adapted to support three adjacent conduits or pipes, wherein centers of the three conduits or pipes approximate the equilateral triangle with the base in the nominally vertical direction, and
    wherein an arrangement of energized electric power cables contained in conduits or pipes supported by the three adjacent openings in a form of the equilateral triangle is effective to reduce electromagnetic field (EMF) emissions from the energized electric power cables.

2. The conduit spacer of claim 1, wherein the base in the nominally vertical direction is defined by centers of the conduits or pipes supported by the conduit support body having an open end extending upwards and one of the two conduit support bodies having an open end extending upwards away from said base.

3. The conduit spacer of claim 1, wherein the upper portion further comprises a male locking tab and a female locking tab for interlocking with adjacent upper portions.

4. The conduit spacer of claim 1, further comprising
    a first reinforcing rib between the two conduit bodies in the lower portion, the first reinforcing rib attached to the two conduit bodies in the lower portion, and
    wherein the upper portion further comprises a fourth support body having an open end extending upwards and a second reinforcing rib between the two conduit bodies in the upper portion having an open end extending upwards, the reinforcing ribs surrounded by reliefs allowing flexure of the bodies when pipe or conduit is assembled into the conduit spacer.

5. A conduit spacer, comprising:
    a lower portion made from plastic material and including a base and two support bodies above the base, the support bodies having open ends extending upwards away from said base, the lower portion further comprising a first supporting rib between the at least two conduit bodies and attached to each of the at least two conduit support bodies; and
    an upper portion made from plastic material and including two support bodies having open ends extending downwards and a support body having an open end extending upwards, the three support bodies adjacent one another and connected to one another through a plurality of ribs of the upper portion, centers of the three support bodies approximating an equilateral triangle with a base in a vertical direction, the base in the vertical direction formed from a center of one of the support bodies having an open end extending downwards and a center of the support body having an open end extending upwards,
    wherein the three support bodies of the upper portion are adapted to support three adjacent conduits or pipes having a same diameter, and wherein centers of the three conduits or pipes approximate the equilateral triangle with the base in a vertical direction, wherein an arrangement of power cables in the three adjacent conduits or pipes in a form of the equilateral triangle is effective to reduce electromagnetic force (EMF) emissions from the energized electric power cables,
    and wherein the upper portion further comprises an additional body having an open end extending upwards that is adapted to support a conduit or pipe having a diameter smaller than the same diameter.

6. The conduit spacer of claim 5, wherein the upper portion having at least one support body having an open end extending upwards comprises two bodies adapted to support two conduits or pipes of the same diameter, the two bodies having open ends extending upwards, and
    further comprising a second upper portion made from plastic material and comprising two support bodies having open ends extending downwards and adapted to support two conduits or pipes of the same diameter, and having two support bodies having open ends extending upwards.

7. The conduit spacer of claim 6, wherein the two support bodies of the second upper portion having open ends extending upwards are adapted to support two additional conduits or pipes of the same diameter, and
    further comprising a third upper portion having two support bodies having open ends extending downwards and adapted to support two conduits or pipes of the same diameter, the third upper portion further comprising two support bodies having open ends extending upwards of which at least one is adapted to support a conduit or pipe of the same diameter, and wherein centers of the three conduits or pipes of the same diameter supported by the third upper portion approximate a second equilateral triangle with a base in a vertical direction.

8. The conduit spacer of claim 7, wherein the second equilateral triangle formed with centers of the three pipes or conduits of the third upper section has a corner in a first direction from the base of the second equilateral triangle and the equilateral triangle has a corner in a second direction opposite the first direction.

9. The conduit spacer of claim 5, wherein the other of the upwardly extending bodies of the third upper portion is adapted to support a conduit or pipe having a smaller diameter than the at least one upwardly extending body adapted to support a conduit or pipe of the same diameter.

10. The conduit spacer of claim 5, wherein an arrangement of the conduit support bodies of the lower and upper portions and an arrangement of electrical cables in the conduit support bodies of the upper and lower portions is adapted to minimize electromagnetic interference (EMI) emissions from electrical transmission lines supported by the support bodies.

11. The conduit spacer of claim 5, wherein the base further comprises a protruding side spacer component on a left side and on a right side of the base for providing a measured space for concrete fill on a side of the spacer.

12. The conduit spacer of claim 5, wherein the upper portion further comprises a second support body having an open end extending upwards and a second reinforcing rib between the two conduit bodies with an open end extending upwards in the upper portion, the reinforcing ribs surrounded by reliefs allowing flexure of the bodies when pipe or conduit is assembled into the conduit spacer.

13. A conduit spacer, comprising:
  a spacer body comprising a set of three orifices in a configuration of an equilateral triangle having one side perpendicular to a bottom of a trench,
  wherein the spacer body is adapted for placement into the trench for supporting conduits for power cables.

14. The conduit spacer according to claim 13, further comprising a base for supporting the spacer body.

15. The conduit spacer according to claim 13, wherein the spacer body comprises a second set of three orifices in a configuration of an equilateral triangle having one side perpendicular to the bottom of the trench, wherein the second set is aligned vertically atop the set of three orifices.

16. A method for spacing electrical power cables, comprising:
  arranging a first electrical power cable in a first plastic duct spacer; and
  arranging second and third electrical power cables in a second plastic duct spacer, wherein the second power cable is directly above or below the first power cable, and centers of the three cables approximate an equilateral triangle having a vertical base formed by the centers of the first and second cables.

17. The method of claim 16, wherein the three electrical power cables have a same diameter.

18. The method of claim 16, further comprising arranging two additional electrical power cables above the second and third electrical power cables with a third plastic duct spacer.

19. The method of claim 18, further comprising arranging an additional electrical power cable above one of the two additional electrical power cables with a fourth plastic duct spacer, wherein the centers of the three additional cables approximate a second equilateral triangle with a base in a vertical direction.

20. The method of claim 19, wherein the six power cables comprise two sets of three-phase electrical power cables and are arranged for cross-phasing in the duct spacers.

21. A method for spacing electrical cables, comprising:
  arranging a first electrical cable into at least one plastic duct spacer; and
  arranging second and third electrical cables into the at least one plastic duct spacer, wherein the second cable is directly above or below the first cable, and centers of the three cables approximate an equilateral triangle having a vertical base formed by the centers of the first and second cables.

22. The method of claim 21, further comprising using a second plastic duct spacer for arranging at least one of the second and third electrical cables.

23. The method of claim 21, wherein the first, second and third cables comprise three phases for three-phase electrical transmission, and further comprising arranging three additional cables in the at least one plastic duct spacer, the three additional cables also comprising three phases for three-phase electrical transmission, wherein the six cables are arranged for cross-phase EMF cancellation.

* * * * *